(12) United States Patent
Takeuchi et al.

(10) Patent No.: US 7,807,298 B2
(45) Date of Patent: Oct. 5, 2010

(54) NON-AQUEOUS ELECTROLYTE SECONDARY BATTERY WITH LAMINATED SEPARATOR

(75) Inventors: Takashi Takeuchi, Osaka (JP); Akira Nagasaki, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 916 days.

(21) Appl. No.: 10/572,590

(22) PCT Filed: Nov. 10, 2004

(86) PCT No.: PCT/JP2004/016653
§ 371 (c)(1),
(2), (4) Date: Mar. 20, 2006

(87) PCT Pub. No.: WO2005/048380
PCT Pub. Date: May 26, 2005

(65) Prior Publication Data
US 2008/0248392 A1    Oct. 9, 2008

(30) Foreign Application Priority Data
Nov. 17, 2003  (JP) ............................. 2003-387160

(51) Int. Cl.
    *H01M 4/58* (2010.01)
(52) U.S. Cl. .............. 429/231.1; 429/231.3; 429/231.6; 429/223; 429/218.1
(58) Field of Classification Search .............. 429/231.1, 429/224, 223, 129, 194
See application file for complete search history.

(56) References Cited

U.S. PATENT DOCUMENTS 5,691,047 A    11/1997    Kurauchi et al.

(Continued)

FOREIGN PATENT DOCUMENTS

CN    1097526    1/1995

(Continued)

OTHER PUBLICATIONS

Pouillerie, C., et al. "Synthesis and Characterization of New LiNi1-yMgyO2 Positive Electrode Materials for Lithium-Ion Batteries." Journal of the Electrochemical Society. 147(6) (2000): 2061-2069.*

(Continued)

*Primary Examiner*—Dah-Wei D Yuan
*Assistant Examiner*—Zachary Best
(74) *Attorney, Agent, or Firm*—McDermott Will & Emery LLP

(57) ABSTRACT

A non-aqueous electrolyte secondary battery including a positive electrode, a negative electrode, a separator interposed between the positive electrode and the negative electrode, and an electrolyte, wherein the positive electrode comprises a positive electrode active material comprising a particle of a composite oxide represented by a general formula: $Li_xMe_{1-y-z}M_yL_zO_2$. In the general formula, the element Me is at least one transition metal element except Ti, Mn, Y and Zr, the element M is at least one selected from the group consisting of Mg, Ti, Mn and Zn, and the element L is at least one selected from the group consisting of Al, Ca, Ba, Sr, Y and Zr, and $1 \leq x \leq 1.05$, $0.005 \leq y \leq 0.1$ (with a proviso that $0.005 \leq y \leq 0.5$ is satisfied in the case of the element M being Mn) and $0 \leq z \leq 0.05$ are satisfied. The separator includes a plurality of laminated monolayer films, the plurality of monolayer films each have a microporous structure, and a positive electrode-side monolayer film selected from the plurality of monolayer films which faces the positive electrode is made of polypropylene.

12 Claims, 6 Drawing Sheets

U.S. PATENT DOCUMENTS

| | | | |
|---|---|---|---|
| 5,856,039 A * | 1/1999 | Takahashi | 429/129 |
| 6,291,103 B1 | 9/2001 | Park et al. | |
| 2003/0134200 A1 * | 7/2003 | Tanaka et al. | 429/231.1 |
| 2003/0138699 A1 | 7/2003 | Kweon et al. | |
| 2004/0058243 A1 * | 3/2004 | Ohzuku et al. | 429/231.1 |
| 2004/0115523 A1 | 6/2004 | Hommura et al. | |
| 2006/0188786 A1 * | 8/2006 | Lee et al. | 429/249 |

FOREIGN PATENT DOCUMENTS

| | | |
|---|---|---|
| CN | 1257318 | 6/2000 |
| EP | 1 391 950 A1 | 2/2004 |
| JP | 7-307146 | 11/1995 |
| JP | 9-259857 | 10/1997 |
| JP | 11-21371 | 1/1999 |
| JP | 2001-273880 | 10/2001 |
| JP | 2002-37631 | 2/2002 |
| JP | 2002-145623 | 5/2002 |
| JP | 2002-203553 | 7/2002 |
| JP | 2002-246000 | 8/2002 |
| JP | 2002-584408 | 10/2002 |
| JP | 2002-321323 | 11/2002 |
| JP | 2003086183 A * | 3/2003 |
| JP | 2003-197172 | 7/2003 |
| JP | 2003-217572 | 7/2003 |
| KR | 1997-0008713 | 2/1997 |
| KR | 1998-0078123 | 11/1998 |
| KR | 20020069601 | 9/2002 |

OTHER PUBLICATIONS

Korean Office Action issued in corresponding Korean Patent Application No. 10-2006-707766, mailed on Nov. 29, 2007.

Chinese Office Action, with English translation, issued in Chinese Patent Application No. CN 2004800320470, mailed Sep. 12, 2008.

Levasseur, S., et al., "On the $Li_xCo_{1-y}Mg_yO_2$ system upon deintercalation: electrochemical, electronic properties and $^7Li$ MAS NMR studies", Journal of Power Sources, 2002, pp. 419-427, vol. 112, Elsevier Science B.V.

Chinese Office Action issued in Chinese Patent Application No. CN 2004800320470 dated on May 30, 2008.

* cited by examiner

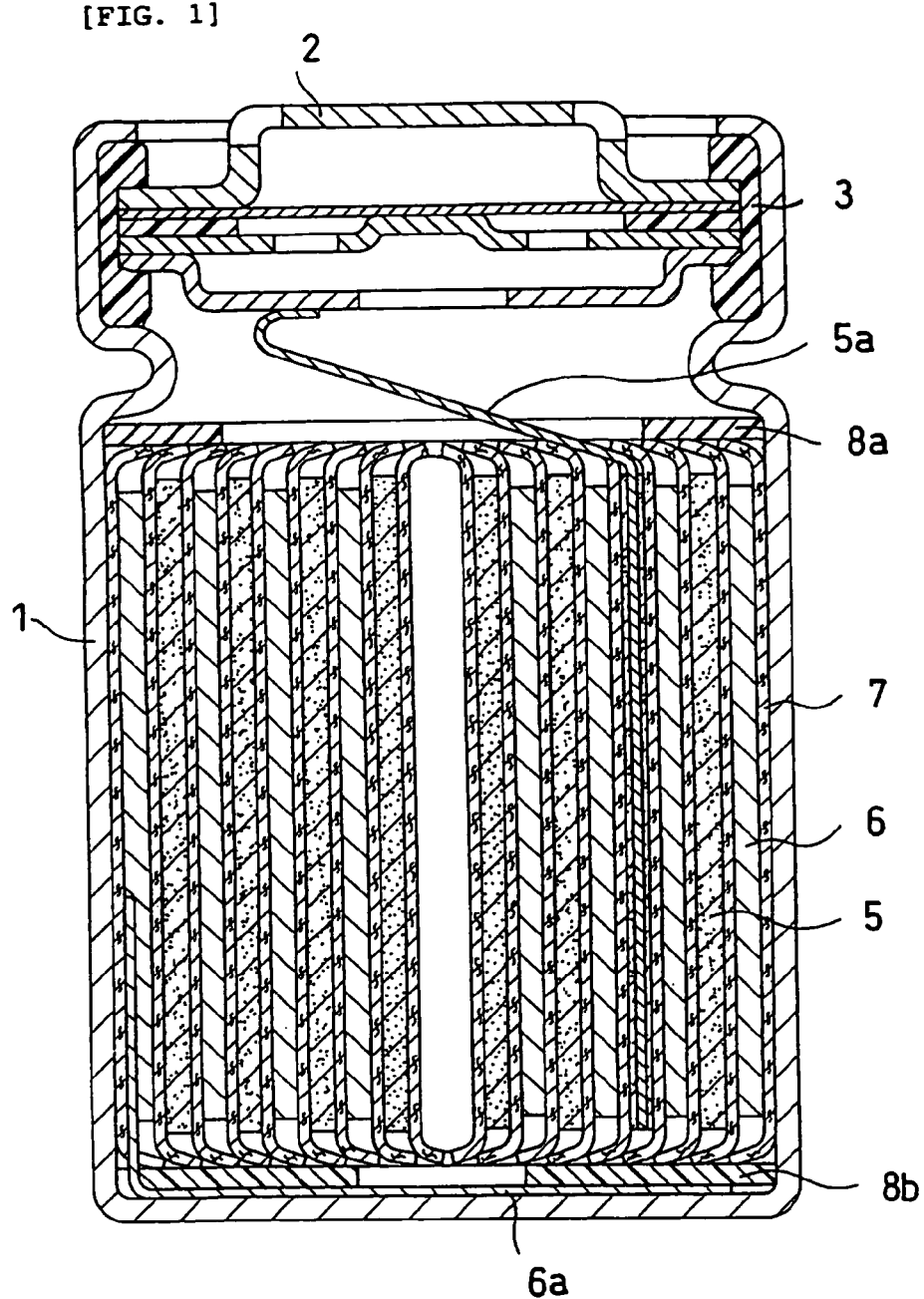
[FIG. 1]

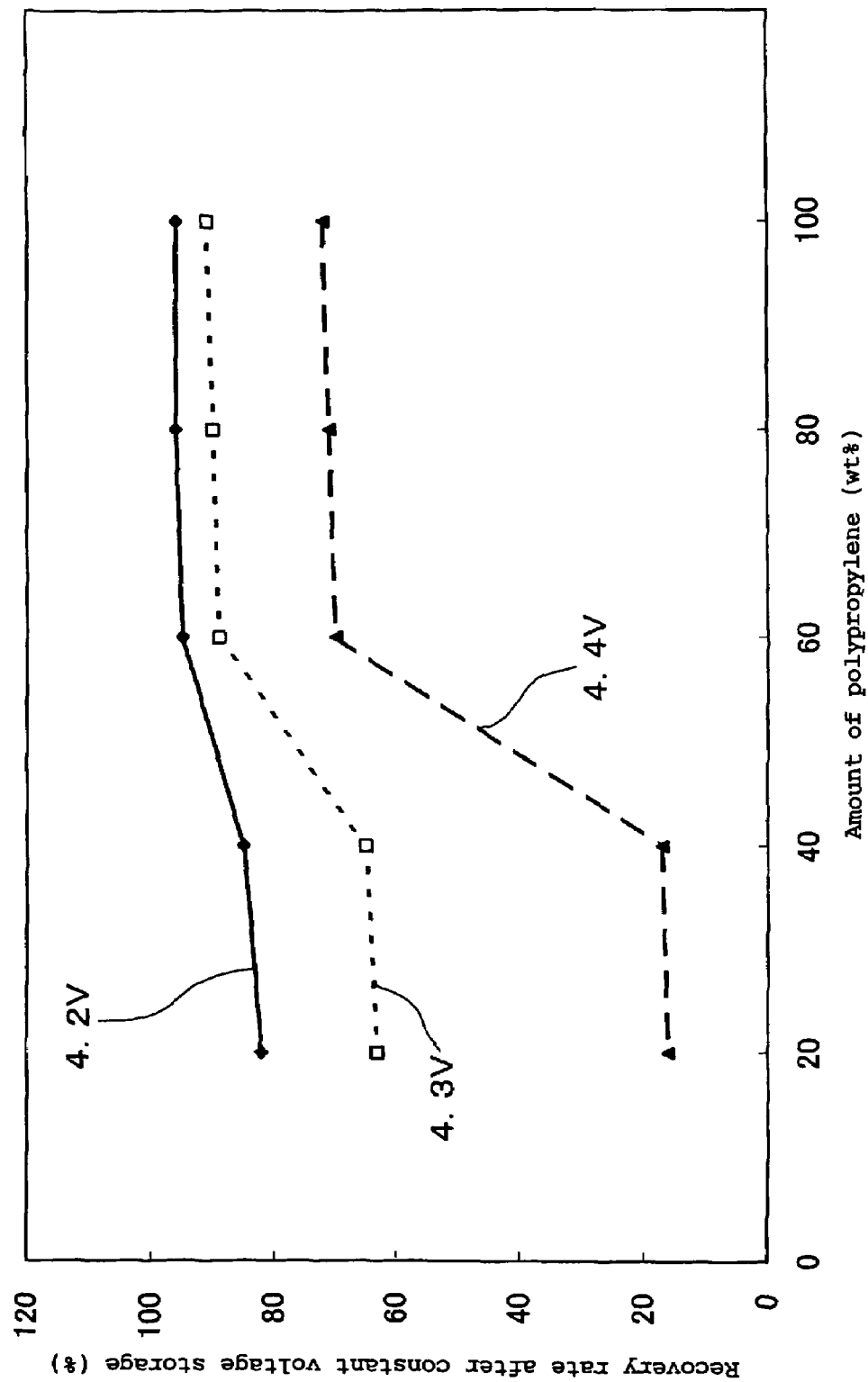
[FIG. 2]

[FIG. 3]
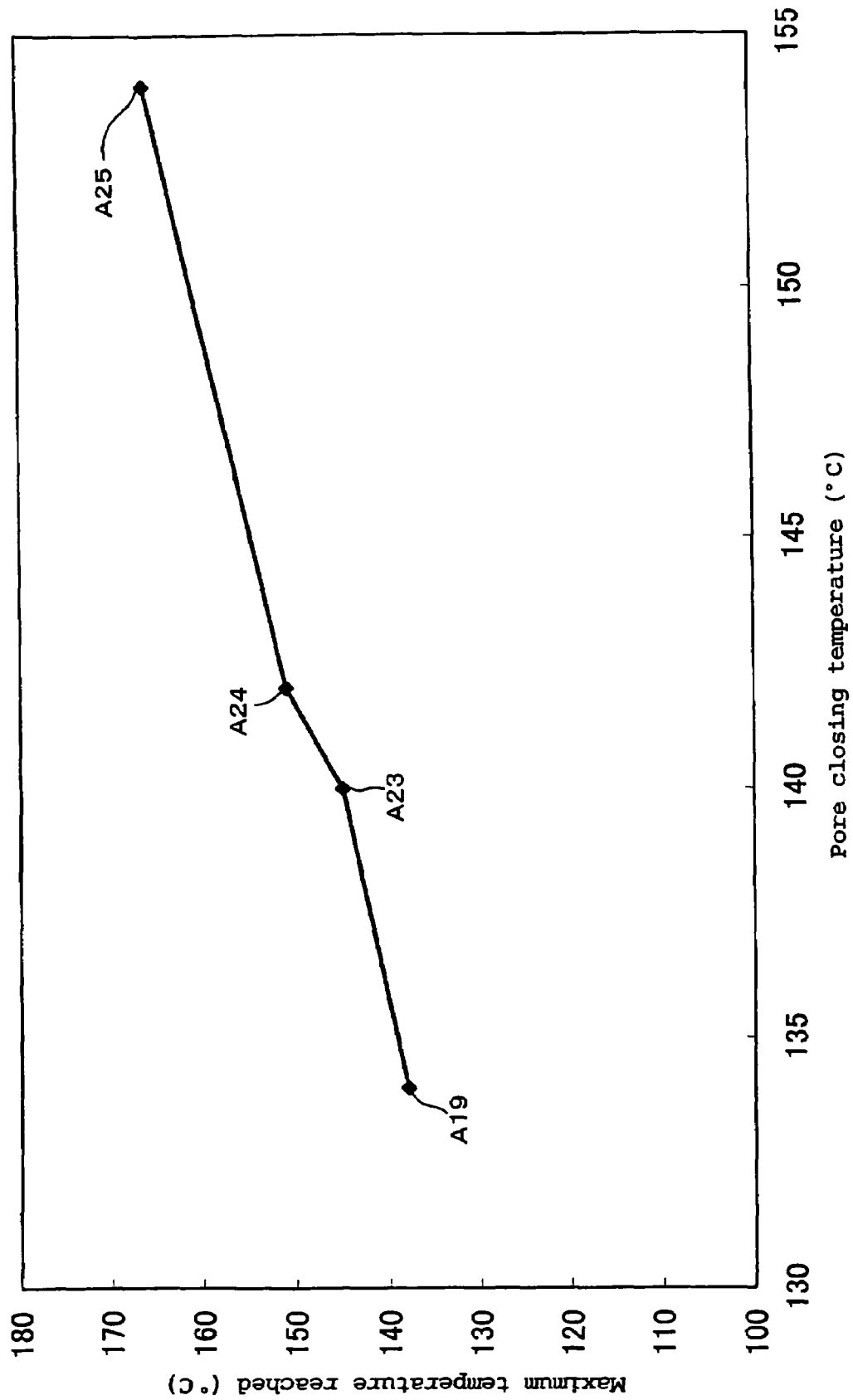

[FIG. 4]
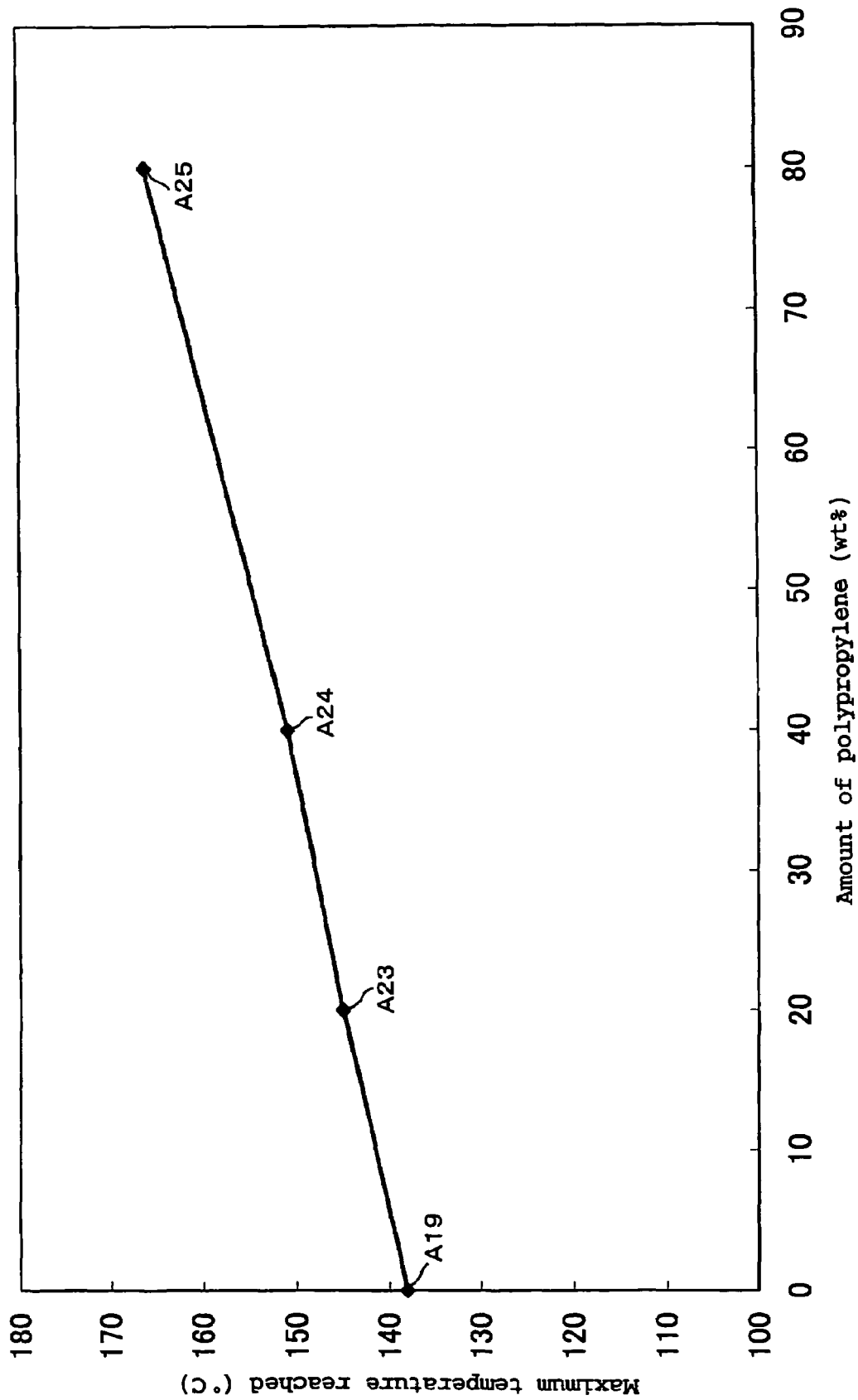

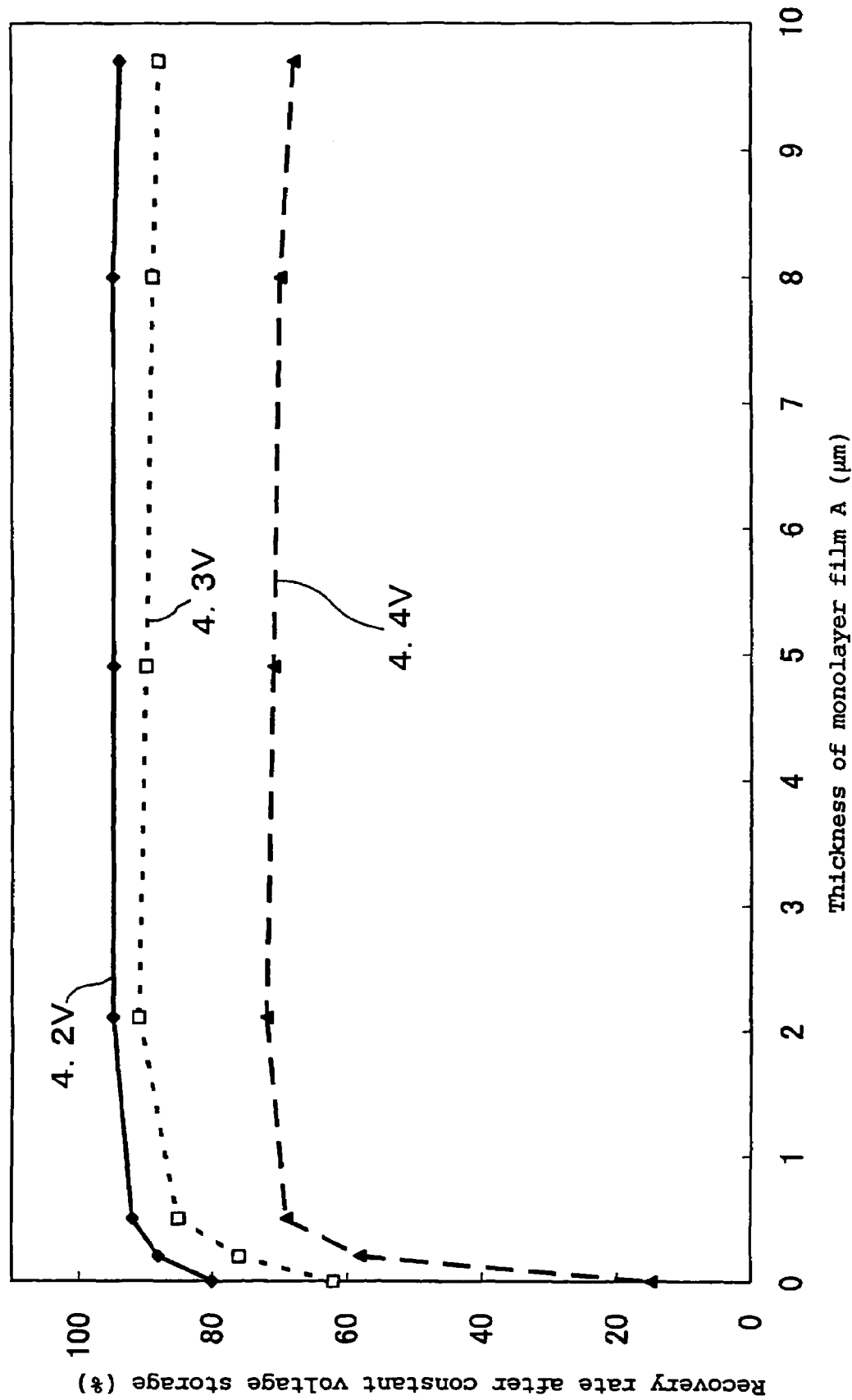
[FIG. 5]

[FIG. 6]
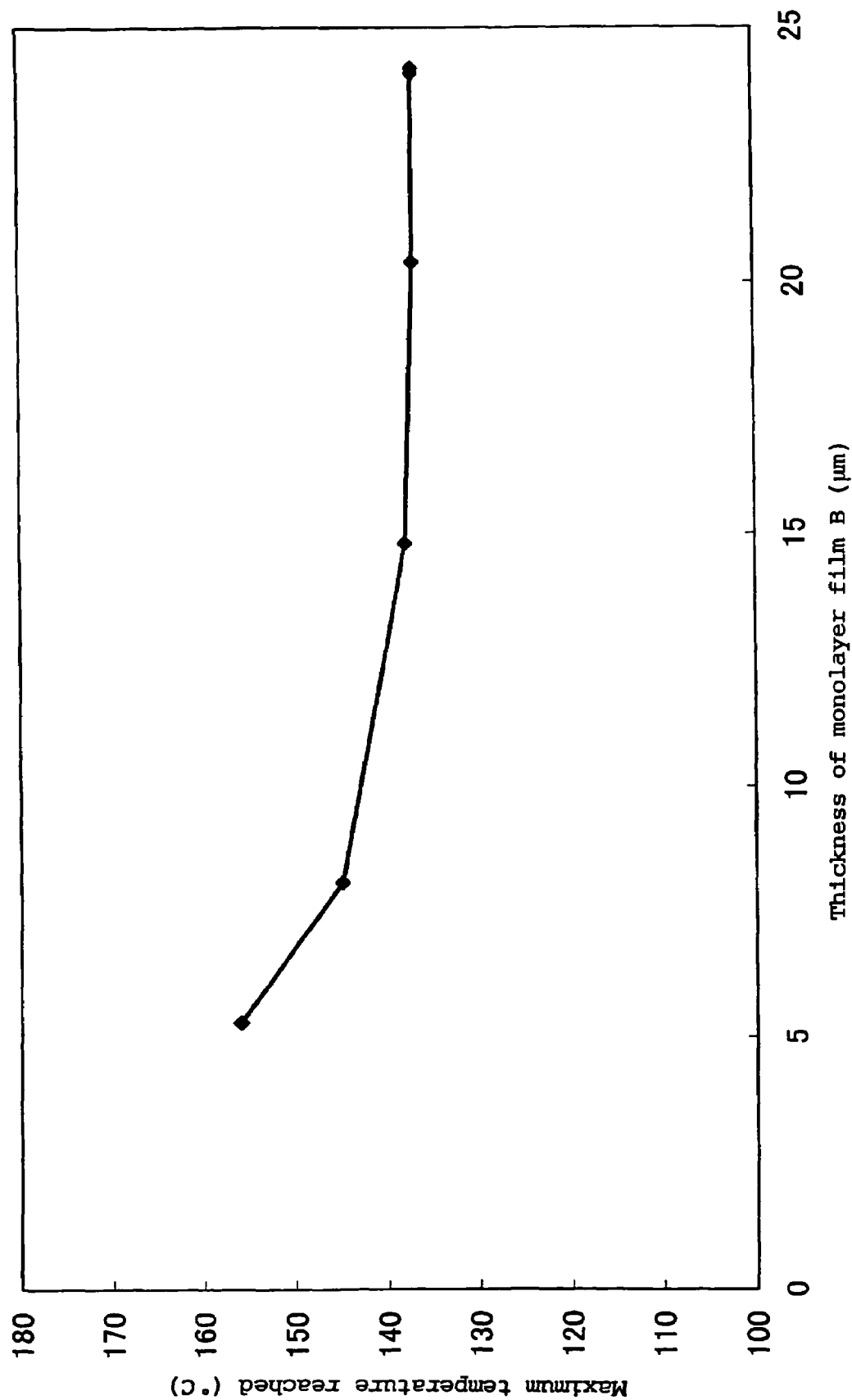

NON-AQUEOUS ELECTROLYTE SECONDARY BATTERY WITH LAMINATED SEPARATOR

This application is the U.S. National Phase under 35 U.S.C. §371 of International Application No. PCT/JP2004/016653, filed Nov. 10, 2004, which in turn claims the benefit of Japanese Application No. 2003-387160, filed Nov. 17, 2003, the disclosures of which Applications are incorporated by reference herein in their entirety.

TECHNICAL FIELD

The present invention relates to a non-aqueous electrolyte secondary battery, and more particularly to an improvement of a positive electrode and a separator contained in the non-aqueous electrolyte secondary battery.

BACKGROUND ART

In recent years, there has been a rapid advancement of portable and cordless electronic devices for consumer use such as telephones, personal computers and video cameras. With this advancement, demand is growing for small and light-weight secondary batteries having a high energy density as a power source for driving these devices. Particularly, the development of non-aqueous electrolyte secondary batteries is vigorously conducted. In a non-aqueous electrolyte secondary battery, a lithium-containing composite oxide is used as a positive electrode active material. As a negative electrode material, a carbon material capable of absorbing and desorbing lithium ions, silicon compound or tin compound is used. Between positive and negative electrodes is interposed generally a separator comprising a microporous film composed of polyethylene (hereinafter referred to as "PE"), polypropylene (hereinafter referred to as "PP") or the like. As a non-aqueous electrolyte, an aprotic organic solvent containing a lithium salt such as $LiBF_4$ or $LiPF_6$ dissolved therein is used.

With an increase in CPU speed for portable personal computers, the amount of heat generated therein is increasing. Moreover, demand is strong for devices with a longer operation time. Under the circumstances, as a power source for such devices, demand is also growing for non-aqueous electrolyte secondary batteries capable of being charged to a higher voltage so as to increase capacity. However, when a non-aqueous electrolyte secondary battery is charged to a charge voltage of not less than 4.2 V in a high temperature environment, the battery performance deteriorates significantly.

From the viewpoint of preventing such deterioration, technical development for separators is conducted vigorously. As the separator, a microporous film made of PE having a relatively low melting point is mainly used.

A microporous film made of PE swiftly melts and deforms to electrically cut off the current between the positive and negative electrodes in the event where the battery reaches an overheated state, serving to ensure safety of the battery. However, when a battery is charged to a voltage of not less than 4.2 V, more specifically, when the positive electrode potential is not less than 4.2 V relative to the potential at which metal lithium is dissolved and deposited, the PE separator is oxidized, which might generate gas.

Patent Document 1: Japanese Laid-Open Patent Publication No. 2001-273880

DISCLOSURE OF INVENTION

Problems to Be Solved by the Invention

In view of the above, a proposal is made to use, as a separator, a multilayer film comprising at least two monolayer films each having a microporous structure and to make a monolayer film made of PP face a positive electrode (Patent Document 1). This multilayer film provides an effect in terms of preventing the generation of gas. However, it cannot prevent the degradation of battery performance when the battery is charged to a voltage of not less than 4.2 V in a high temperature environment.

The present invention relates to a non-aqueous electrolyte secondary battery comprising a positive electrode, a negative electrode, a separator interposed between the positive electrode and the negative electrode, and an electrolyte, wherein the positive electrode comprises a positive electrode active material comprising a particle of a composite oxide represented by a general formula: $Li_xMe_{1-y-z}M_yL_zO_2$ where the element Me is at least one transition metal element except Ti, Mn, Y and Zr, the element M is at least one selected from the group consisting of Mg, Ti, Mn and Zn, the element L is at least one selected from the group consisting of Al, Ca, Ba, Sr, Y and Zr, and the general formula satisfies $1 \leq x \leq 1.05$, $0.005 \leq y \leq 0.1$ (with a proviso that $0.005 \leq y \leq 0.5$ is satisfied in the case of the element M being Mn) and $0 \leq z \leq 0.05$, the separator comprises a plurality of laminated monolayer films, the plurality of monolayer films each have a microporous structure, and a positive electrode-side monolayer film selected from the plurality of monolayer films which faces the positive electrode comprises polypropylene.

The element Me is preferably Ni and/or Co. When the element Me includes Ni and Co, the general formula is represented by a formula (1): $Li_xNi_vCo_wM_yL_zO_2$, where $1-y-z=v+w$. In this case, the formula (1) preferably satisfies $0.2 \leq v \leq 0.85$.

When the element Me includes Ni and Co, and the element M is Mn, the general formula preferably satisfies $0.1 \leq y \leq 0.5$. When the general formula is represented by a formula (2): $Li_xNi_vCo_wMn_yL_zO_2$, where $1-y-z=v+w$, the formula (2) preferably satisfies $0.1 \leq y \leq 0.5$, $0.2 \leq v \leq 0.7$ and $0.1 \leq w \leq 0.4$.

When the element Me includes Ni and Co, the element M is Mg, and the element L is Al, the general formula preferably satisfies $0.005 \leq y \leq 0.03$ and $0.01 \leq z \leq 0.05$. When the general formula is represented by a formula (3): $Li_xNi_vCo_w-Mg_yL_zO_2$, where $1-y-z=v+w$, the formula (3) preferably satisfies $0.005 \leq y \leq 0.03$ and $0.01 \leq z \leq 0.05$, as well as $0.7 \leq v \leq 0.85$ and $0.1 \leq w \leq 0.25$.

Preferably, the positive electrode-side monolayer film further comprises polyethylene. In this case, the amount of the polypropylene is preferably not less than 60 wt % relative to the total amount of the polypropylene and the polyethylene. As the positive electrode-side monolayer film, for example, a blend polymer of polypropylene and polyethylene can be used.

Preferably, the element M is uniformly distributed in the particle, and the element L is distributed more in a surface portion of the particle than an inside of the particle.

When a radius of the particle is r, for example, the element L is preferably distributed in a region within 0.3r from the surface of the particle at a concentration not less than 1.2 times higher than that in a region within 0.3r from the center of the particle.

Preferably, at least one selected from the plurality of monolayer films has a pore closing temperature of 110 to 140° C.

The monolayer film that faces the positive electrode may have a pore closing temperature of 110 to 140° C. When a monolayer film having a pore closing temperature of 110 to 140° C. does not face the positive electrode, the monolayer film preferably comprises polyethylene.

Preferably, the monolayer film having a pore closing temperature of 110 to 140° C. further comprises polypropylene. In this case, the amount of the polypropylene is preferably not greater than 20 wt % relative to the total amount of the polyethylene and the polypropylene. As the monolayer film having a pore closing temperature of 110 to 140° C., for example, a blend polymer of polyethylene and polypropylene can be used.

Of the plurality of monolayer films, at least one monolayer film having a pore closing temperature of 110 to 140° C. preferably has a thickness of not less than 8 μm.

The positive electrode-side monolayer film preferably has a thickness of not less than 0.2 μm and not greater than 5 μm.

Preferably, at least one of the plurality of monolayer films is formed by drawing a sheet obtained by extrusion in two directions.

When the positive electrode-side monolayer film has an average pore size D1 based on a total pore volume measured by a mercury intrusion method, and the monolayer film having a pore closing temperature of 110 to 140° C. has an average pore size D2 based on a total pore volume measured by a mercury intrusion method, D1<D2 is preferably satisfied.

The present invention further relates to a non-aqueous electrolyte secondary battery comprising a positive electrode, a negative electrode, a separator interposed between the positive electrode and the negative electrode, and an electrolyte, wherein the positive electrode comprises a positive electrode active material comprising a particle of a composite oxide represented by a general formula: $Li_xCo_{1-y-z}M_yL_zO_2$ where the element M is at least one selected from the group consisting of Mg, Ti, Mn and Zn, the element L is at least one selected from the group consisting of Al, Ca, Ba, Sr, Y and Zr, and the general formula satisfies $1 \leq x \leq 1.05$, $0.005 \leq y \leq 0.1$ and $0 \leq z \leq 0.05$, the separator comprises a plurality of laminated monolayer films, the plurality of monolayer films each have a microporous structure, and a positive electrode-side monolayer film selected from the plurality of monolayer films which faces the positive electrode comprises polypropylene.

Effects of the Invention

A non-aqueous electrolyte secondary battery of the present invention can maintain the performance and ensure safety even when charged to a high voltage (namely, a voltage of 4.2 V or higher) at a high temperature. The present invention is particularly useful where a non-aqueous electrolyte secondary battery is charged by a charge control system whose end-of-charge voltage is set to not less than 4.3 V.

BRIEF DESCRIPTION OF DRAWINGS

FIG. 1 is a vertical cross-sectional view of a cylindrical battery according to the present invention.

FIG. 2 is a graph showing amount of polypropylene contained in a monolayer film A for separator versus recovery rate after constant voltage storage for batteries produced in EXAMPLE 4.

FIG. 3 is a graph showing pore closing temperature of a separator versus maximum temperature measured during an external short-circuit test for batteries produced in EXAMPLE 5.

FIG. 4 is a graph showing amount of polypropylene contained in a monolayer film B for separator versus maximum temperature measured during an external short-circuit test for batteries produced in EXAMPLE 5.

FIG. 5 is a graph showing thickness of a monolayer film A for separator versus recovery rate after constant voltage storage for batteries produced in EXAMPLE 6.

FIG. 6 is a graph showing thickness of a monolayer film B for separator versus maximum temperature measured during an external short-circuit test for batteries produced in EXAMPLE 6.

BEST MODE FOR CARRYING OUT THE INVENTION

A non-aqueous electrolyte secondary battery of the present invention comprises a positive electrode, a negative electrode, a separator interposed between the positive electrode and the negative electrode, and an electrolyte. The battery satisfies the following conditions.

[Condition 1]

The positive electrode comprises a positive electrode active material comprising a particle of a composite oxide represented by a general formula: $Li_xMe_{1-y-z}M_yL_zO_2$.

The element Me is at least one transition metal element except Ti, Mn, Y and Zr.

The element M is at least one selected from the group consisting of Mg, Ti, Mn and Zn.

The element L is at least one selected from the group consisting of Al, Ca, Ba, Sr, Y and Zr.

The general formula satisfies $1 \leq x \leq 1.05$, $0.005 \leq y \leq 0.1$ (with a proviso that $0.005 \leq y \leq 0.5$ is satisfied in the case of element M being Mn) and $0 \leq z \leq 0.05$.

When the element M is a combination of Mn and at least one selected from the group consisting of Mg, Ti and Zn, preferably, the general formula satisfies $0.005 \leq y \leq 0.5$, and the amount of the at least one selected from the group consisting of Mg, Ti and Zn is not greater than 0.1 relative to the amount of y.

In the positive electrode active material, it is surmised that the element M stabilizes the crystal of $Li_xMeO_2$ in the state of a high potential when $x \leq 0.5$. It is also surmised that the element L exists in the crystal and contributes to the stabilization of the crystal, and a part of the element L exists on the surface of the active material particles in the form of an oxide, carbonate or hydroxide, thereby preventing the reaction between the electrolyte and the active material.

[Condition 2]

The separator comprises a plurality of laminated monolayer films. The plurality of monolayer films each have a microporous structure. The positive electrode-side monolayer film selected from the plurality of monolayer films that faces the positive electrode comprises polypropylene (PP).

When the monolayer film that faces the positive electrode is made of PP, the oxidation of the separator is prevented. When the separator is a multilayer film comprising a plurality of monolayer films, a monolayer film made of PE can be included in the multilayer film, so that the separator can exert so-called shut-down function at a relatively low temperature. Accordingly, the safety of the battery can be enhanced.

The effect of improving the performance of the non-aqueous electrolyte secondary battery is small when either of Condition 1 and Condition 2 is satisfied, which means there is a margin for improvement. When both Condition 1 and Condition 2 are satisfied, on the other hand, Condition 1 and Condition 2 produce a synergistic effect, and the effect of improving the battery performance becomes remarkable even when the battery is charged to a high voltage of not less than 4.2 V at a high temperature.

When a battery charged to a high voltage is stored at a high temperature for a predetermined period of time, the discharge characteristic is considered to degrade as follows. Oxygen released from the positive electrode active material first reacts with protons released due to oxidation from a microporous film made of PE serving as the separator, and thus $H_2O$ is produced. The produced $H_2O$ then decomposes $LiPF_6$ serving as a solute for the electrolyte or the main component of the electrolyte such as a non-cyclic carbonic acid ester or a cyclic carbonic acid ester, thereby forming a film made of LiF, $Li_2CO_3$, $Li_2O$ or the like on the negative electrode active material surface. As a result, the film accumulates on the negative electrode active material surface, which inhibits the absorption and desorption of lithium ions by the negative electrode active material. This degrades the discharge characteristic.

Because a series of reactions as described above involved in the production of $H_2O$ interact with each other, even if only the positive electrode is improved, oxygen is relatively easily removed from the positive electrode by protons generated from the microporous film made of PE. Alternatively, the PE is easily oxidized by active oxygen released from the positive electrode, which produces protons. For this reason, it is necessary to improve the positive electrode and the separator simultaneously.

Protons are produced not only by the oxidation of a separator made of PE, but also by an electrolysis of an organic compound included in the electrolyte, water that enters the battery during assembly, binders contained in the positive electrode and the negative electrode, and surface functional groups of a carbon material contained in the negative electrode during charge/discharge. Accordingly, the $H_2O$ producing reaction cannot be prevented completely by only changing the separator material from PE to PP.

A description is now given of required characteristics for separators.

As basic characteristics, a separator should have an ability to insulate a positive electrode and a negative electrode from each other so as to prevent the electronical connection therebetween, and allow ions to pass therethrough while retaining an electrolyte. At the same time, a separator should be stable chemically or electrochemically, and has excellent retention of electrolyte and a predetermined mechanical strength during production and operation of the battery.

In the event where an external short-circuit occurs in a non-aqueous electrolyte secondary battery having a high energy density, a large short-circuit current flows in the battery, and the Joule heat is generated, increasing the temperature of the battery to an excessively high level. In order to ensure safety, a separator having a microporous structure should melt and close the pores when the battery temperature reaches an excessively high level. Such a function to cut off the current is called shut-down function.

Batteries are possibly exposed to a high temperature environment in such a manner to be left in a car on a hot summer day. Considering such possibility, batteries should not lose their battery function in an environment of about 100° C. Accordingly, it is desirable that separators exert the shut-down function when the battery temperature falls within a range of 110 to 140° C.

The separator used in the present invention is described here in further detail.

In the oxidation of a separator, in order to oxidize the PE and to release protons, it is surmised that molecular orbital of PE needs to form a plane geometry of the $sp^2$ hybrid orbital. Based on this observation, the present invention focuses to prevent free rotation of the main chain of PE to inhibit the formation of a plane geometry. It is presumed that, if PE does not take a shape of plane, the oxidation of PE can be prevented.

In order to prevent free rotation of the main chain of PE, a combined use of PE with PP having a side chain is preferred. Particularly, the use of a blend polymer of PE and PP is effective. From the viewpoint of completely preventing the oxidation of separator, in a separator comprising PP and PE, the amount of PP is not less than 60 wt % relative to the total amount of PE and PP. The use of PP in an amount of not less than 60 wt % effectively prevents the oxidation of the separator even when the battery is charged to a high voltage of not less than 4.2 V at a high temperature. Particularly preferred amount of PP is not less than 70 wt %. In addition, although the positive electrode-side monolayer film can be a monolayer film made of PP alone, in order to ensure that the separator has shut-down characteristic to a predetermined degree, PE is preferably contained.

Ordinarily, separators are required to have a characteristic to ensure battery safety in such a manner that the separator melts and deforms when the battery temperature reaches an excessively high level to close the pores, thereby cutting off the electrical connection between the positive and negative electrodes (hereinafter referred to as "shut-down characteristic"). For this reason, a microporous film made of PE having a relatively low melting point is mainly used as the separator.

From the viewpoint of ensuring the shut-down characteristic, the separator comprising a plurality of monolayer films preferably has at least one monolayer film having a pore closing temperature of 110 to 140° C. As the monolayer film having a pore closing temperature of 110 to 140° C., a monolayer film made of PE can be used.

The monolayer film made of PE can further comprise PP. Particularly, it is effective to use a blend polymer of PE and PP. When the amount of PP exceeds 20 wt % relative to the total amount of PE and PP, the shut-down characteristic degrades. Accordingly, the effect of preventing the temperature increase due to heat generation in the event of an external short-circuit is reduced.

Higher capacity batteries are needed these days. As a means of achieving such batteries, attempts are made to make a separator thinner and to increase the amount of active material contained in a battery. However, a separator having a reduced thickness usually results in reduced shut-down characteristic. For this reason, currently, in a non-aqueous electrolyte secondary battery having a jelly-roll type electrode group or jelly-roll type flat electrode group, a separator having a thickness of 16 μm to 30 μm is used. The thickness of the separator of the present invention should be determined considering the shut-down characteristic.

In the present invention, the monolayer film that controls shut-down characteristic, in other words, the monolayer film having a pore closing temperature of 110 to 140° C. preferably has a thickness of not less than 8 μm. As for the thickness of the positive electrode-side monolayer film, although a thickness of not less than 0.2 μm is sufficient to obtain the effect of preventing the oxidation of the separator, preferred is a thickness of not less than 0.5 μm. In order to ensure that the monolayer film that controls shut-down characteristic has a sufficient thickness, the positive electrode-side monolayer film preferably has a thickness of not greater than 5 μm. Further, the total thickness of the separator is preferably not greater than 30 µm. From the viewpoint of achieving a high capacity and safety, the total thickness of the separator is preferably 16 µm to 20 µm.

From the viewpoint of preventing the oxidation of the separator and obtaining favorable discharge characteristic, the average pore size D1 of the positive electrode-side monolayer film and the average pore size D2 of the monolayer film having a pore closing temperature of 110 to 140° C. preferably satisfy D1<D2. When D2≦D1, the discharge capacity during high load discharge tends to be low.

The separator used in the present invention is preferably produced as follows. For example, different monolayer films are first produced separately, which are then heat-rolled by calender rolls or the like to bond the plurality of monolayer films. Alternatively, co-extrusion process can be used in which, with the use of multilayered dies, a plurality of different melted resins are extruded through the dies, and at the same time, they are bonded together. Considering the productivity of the separator comprising a plurality of monolayer films, co-extrusion process is preferred in which a plurality of different melted resins are extruded through dies, and at the same time, they are bonded together. An example of such production process is disclosed by Japanese Laid-Open Patent Publication No. 2002-321323. According to this process, a multilayer film is formed by co-extrusion using T-dies, and monolayer films, each having a thickness of not greater than 5 µm, can be formed into a multilayer film.

As the method for producing the monolayer film, wet method or dry method can be used.

In the wet method, for example, melted polyolefin resin is extruded into a film through an extruder equipped with a T-die at the tip thereof or inflation molding machine, which is then annealed to form a crystalline part and an amorphous part. Subsequently, the obtained film is drawn using uniaxial multistage rollers to form a microporous structure. The thickness of the monolayer film can be controlled to a desired thickness by optimizing the amount of polyolefin resin extruded in the extrusion step. The pore size of the monolayer film can be controlled to a desired size by optimizing the speeds of the rollers of the uniaxial multistage rollers in the drawing step.

In the wet method, for example, melted polyolefin resin and an organic liquid are mixed and kneaded, which are then extruded into a film using a biaxial extruder equipped with a T-die at the tip thereof or inflation molding machine. The organic liquid is then extracted and removed, whereby a microporous structure is formed. The thickness of the monolayer film can be controlled to a desired thickness by optimizing the amount of polyolefin resin extruded in the extrusion step. The pore size of the monolayer film can be controlled to a desired size by performing drawing treatment at least either before or after the treatment for forming a microporous structure. The drawing treatment can be performed in one direction either horizontally or vertically, or in two directions both horizontally and vertically. From the viewpoint of mechanical strength of the monolayer film, the drawing is preferably performed in two directions both horizontally and vertically.

In the case where a monolayer film having a larger micropore size is needed, the film can be formed in the same manner as above by mixing and kneading melted polyolefin resin, an organic liquid and an inorganic filler, after which the organic liquid and the inorganic filler are extracted and removed, followed by drawing.

In the case of forming a jelly-roll type electrode group or jelly-roll flat type electrode group using a thin separator having a thickness of not greater than 30 µm, the separator may be broken during the winding step of electrode plates, causing insulation failure. Such insulation failure is also caused by burrs of metal current collector formed on the edge of an electrode plate or by the entrance of foreign matter between the separator and the electrode plate. The occurrence of insulation failure tends to be high particularly in a separator formed by drawing a film obtained through extrusion in one direction. A separator formed by drawing a film in one direction has poor mechanical strength in a direction vertical to the drawing direction, so that it is likely to be torn in parallel to the drawing direction.

In view of the above, in order to enhance the mechanical strength of the separator, at least one of the monolayer films is preferably a monolayer film formed by drawing a sheet obtained through extrusion in two directions. Particularly preferably, the whole separator comprises sheets obtained through extrusion or a laminate of such sheets each drawn in two directions.

The positive electrode active material used in the present invention is now described in detail.

The positive electrode active material comprises a particle of a composite oxide represented by a general formula: $Li_xMe_{1-y-z}M_yL_zO_2$.

In the general formula, the element Me is at least one transition metal element except for Ti, Mn, Y and Zr. The element M is at least one selected from the group consisting of Mg, Ti, Mn and Zn. The element L is at least one selected from the group consisting of Al, Ca, Ba, Sr, Y and Zr.

The general formula satisfies $1 \leq x \leq 1.05$, $0.005 \leq y \leq 0.1$ (with a proviso that $0.005 \leq y \leq 0.5$ is satisfied in the case of the element Me being Mn) and $0 \leq z \leq 0.05$.

The value of x in the general formula is a value before the start of charge/discharge, and it fluctuates during charge/discharge. When x<1, the amount of the actual active material (namely, Li) in the non-aqueous electrolyte secondary battery is small so that the capacity of the positive electrode active material tends to be small. Conversely, when 1.05<x, excess Li forms an alkaline compound such as LiO or $Li_2CO_3$ on the surface of the positive electrode active material, which tends to facilitate the generation of gas during high temperature storage.

When y<0.005, the effect of the element M to stabilize the crystal of the active material is small. When 0.1<y, the capacity of the active material is largely decreased. However, when the element M is Mn, because Mn has little effect on the capacity decrease of the active material, Mn can be added to the active material in an amount of $y \leq 0.5$.

Because the element L is not involved in charge/discharge capacity, when 0.05<z, the rated battery capacity decreases. In order to obtain the effect of the element L to prevent the reaction between the electrolyte and the active material, on the other hand, the general formula preferably satisfies $0.001 \leq y$.

As the element Me, Ni, Co, Fe, Cr, V or the like can be used. Preferred are Ni or Co or the combination of Ni and Co. From the viewpoint of average discharge voltage required by equipment, the element Me preferably includes Co alone. From the viewpoint of high capacity required by the market, the element Me preferably includes the combination of Ni and Co.

When the element Me includes Ni and Co (i.e., when the element Me is the combination of Ni and Co), the general formula: $Li_xMe_{1-y-z}M_yL_zO_2$ can be expressed as a formula (1): $Li_xNi_vCo_wM_yL_zO_2$ where $1-y-z=v+w$. In this case, the formula (1) preferably satisfies $0.2 \leq v \leq 0.85$. When v<0.2, the effect of achieving a high capacity offered by Ni is too small. When the amount of Ni is very large and v exceeds 0.85, the cycle characteristic degrades because the stability of the crystal decreases.

When the element Me includes Ni and Co, and the element M is Mn, the general formula preferably satisfies $0.1 \leq y \leq 0.5$. A positive electrode active material having a composition like this has a relatively large capacity, and releases less oxygen even when charged to a high voltage at a high temperature. As such, it is presumed that the crystal is stabilized. In this case, the general formula can be expressed as a formula (2): $Li_xNi_vCo_wMn_yL_zO_2$, where $1-y-z=v+w$. The formula (2) preferably satisfies $0.1 \leq y \leq 0.5$, as well as $0.2 \leq v \leq 0.7$ and $0.1 \leq w \leq 0.4$.

When the element Me includes Ni and Co, the element M is Mg, and the element L is Al, the general formula preferably satisfies $0.005 \leq y \leq 0.03$ and $0.01 \leq z \leq 0.05$. A positive electrode active material having a composition like this has a very large capacity and releases less oxygen when charged to a high voltage at a high temperature. In this case, the general formula can be expressed as a formula (3): $Li_xNi_vCo_wMg_yL_zO_2$, where $1-y-z=v+w$. The formula (3) preferably satisfies $0.005 \leq y \leq 0.03$ and $0.01 \leq z \leq 0.05$, as well as $0.7 \leq v \leq 0.85$ and $0.1 \leq w \leq 0.25$.

When the element Me is Co alone, the general formula: $Li_xMe_{1-y-z}M_yL_zO_2$ can be expressed as a formula (4): $Li_xCo_{1-y-z}M_yL_zO_2$. The formula (4) preferably satisfies $1 \leq x \leq 1.05$, $0.005 \leq y \leq 0.1$ and $0 \leq z \leq 0.05$.

The composite oxides represented by the general formula: $Li_xMe_{1-y-z}M_yL_zO_2$ can be synthesized by a method in which a compound containing the element Me, a lithium compound, a compound containing the element M and a compound containing the element L are pulverized and then mixed at a desired composition, followed by baking, or by solution reaction. Particularly preferred is the baking method. The baking temperature is preferably a temperature at which the mixed compound is partially decomposed or melted, namely 250 to 1500° C.

The mixed compound is preferably baked for 1 to 80 hours. The atmosphere gas for the baking is preferably an oxidizing atmosphere, e.g., baked in air. The baked product is pulverized into a predetermined particle size, which is used as the positive electrode active material.

As the compound containing the element Me, inorganic salts such as carbonates, oxides and hydroxides can be used. When the element Me is cobalt, examples of cobalt compound include cobalt carbonate, cobalt hydroxide, cobalt nitrate, cobalt sulfate and cobalt oxide. When the element Me is nickel, examples of nickel compound include nickel hydroxide, nickel oxide, nickel sulfate and nickel carbonate. Even when the element Me is other metal element than cobalt and nickel, similar to the above, its inorganic salts such as oxides and hydroxides can be used.

As the lithium compound, lithium carbonate, lithium hydroxide, lithium nitrate, lithium sulfate, lithium oxide, etc. can be used. Among them, the most advantageous are lithium carbonate and lithium hydroxide in terms of environmental protection and cost.

Similarly, as the compound containing the element M, inorganic salts such as oxides and hydroxides can be used. When the element M is Mg, for example, magnesium carbonate, magnesium oxide, etc. can be used. When the element M is Mn, for example, manganese carbonate, manganese hydroxide, manganese oxyhydroxide, manganese chloride, manganese sulfate, manganese nitrate, etc. can be used. When the element M is Ti, for example, titanium monoxide, titanium sesquioxide, titanium sulfate, etc. can be used. When the element M is Zn, for example, zinc oxide, zinc chloride, zinc acetate, zinc sulfate, zinc nitrate, zinc hydroxide, zinc oxalate, zinc phosphate, etc. can be used.

Similarly, as the compound containing the element L, inorganic salts such as oxides and hydroxides can be used. When the element L is Al, for example, aluminum hydroxide, aluminum oxide, aluminum nitrate, aluminum fluoride, aluminum sulfate, etc. can be used. When the element M is Ca, for example, calcium hydroxide, calcium oxide, calcium carbonate, calcium chloride, calcium nitrate, calcium sulfate, etc. can be used. When the element M is Ba, for example, barium hydroxide, barium sulfate, barium nitrate, barium oxide, barium chloride, etc. can be used. When the element M is Sr, for example, strontium hydroxide, strontium oxide, strontium carbonate, strontium chloride, strontium nitrate, strontium sulfate, etc. can be used. When the element M is Y, for example, yttrium hydroxide, yttrium oxide, yttrium carbonate, yttrium chloride, yttrium sulfate, etc. can be used. When the element M is Zr, for example, zirconium hydroxide, zirconium oxide, zirconium carbonate, zirconium tetrachloride, zirconium sulfate, zirconium nitrate, etc. can be used.

Preferably, the element M is uniformly distributed in the particle of the composite oxide represented by the general formula: $Li_xMe_{1-y-z}M_yL_zO_2$ and the element L is distributed more in the surface portion of the particle than the inside of the particle. This configuration prevents the tap density of the active material from decreasing. At the same time, the effect produced by the addition of the element M and element L can be utilized most effectively.

In this case, the element M needs not necessarily be distributed completely uniformly throughout the particle. The advantages of the present invention can be obtained as long as the distribution of the element M inside the particle is substantially much the same as that of the element M in the surface portion of the particle.

The element L, on the other hand, is preferably distributed more in the surface portion of the particle from the viewpoint of preventing the tap density of the active material from decreasing. More specifically, when the radius of the particle is r, the element L is preferably distributed in a region within 0.3r from the surface of the particle at a concentration not less than 1.2 times higher than that in a region within 0.3r from the center of the particle.

The radius of the particle r is ½ the average particle size of all the particles forming the active material. As used herein, the "average particle size" is a Feret's diameter determined by a counting method using an electron microscope.

The concentration of the element in a region within 0.3r from the surface of the particle and that in a region within 0.3r from the center of the particle can be determined by a method described below. The active material is first formed into a pellet. The region within 0.3r from the surface of the pellet is sputtered to determine the composition of elements contained in that region. Thereafter, the sputtering is continued, and the composition of elements contained in the region from the depth of 0.7r to 1r from the pellet surface is determined. From the compositions thus obtained, the concentration or concentration ratio of predetermined elements can be calculated.

The composition of the elements can be determined by secondary ion mass spectrometry (SIMS), time of flight mass spectrometry (TOF-SIMS), X-ray photoelectron spectroscopy (ESCA), Auger spectroscopy and X-ray microanalysis (EPMA).

In order to obtain composite oxides as described above, a production process involving the following two steps (Steps A and B) is preferably employed.

(1) Step A

Step A is performed to prepare a compound X comprising at least one element M selected from the group consisting of Mg, Ti, Mn and Zn, and a transition metal element Me, in which the element M and the transition metal element Me are uniformly distributed.

The preparation of the compound X is not specifically limited. Preferred is a coprecipitation method in which an aqueous alkaline solution is fed into an aqueous solution prepared by dissolving an inorganic salt of the transition metal element Me and a salt of the element M, so as to precipitate a hydroxide.

The coprecipitation method is described for the case where the transition metal element Me is Co. However, it should be understood that the method is performed in the same manner when the Me is Ni or other transition metal element.

In the coprecipitation method, the following can be used as raw materials. As the salt of Co, cobalt sulfate, cobalt nitrate, etc. can be used. They may be used singly or in any combination. Among them, particularly preferred is cobalt sulfate. When the Me is Ni, as the salt of Ni, nickel sulfate, nickel nitrate, etc. can be used as the raw material.

As a salt of the element M, sulfates, nitrates, and carbonates can be used. Examples of the salt of Mg include magnesium sulfate, magnesium nitrate, magnesium hydroxide, basic magnesium carbonate, magnesium chloride, magnesium fluoride, magnesium acetate, magnesium oxalate, magnesium sulfide, etc. Likewise, as the salt of Ti, titanium sulfate, etc. can be used. As the salt of Mn, manganese sulfate, manganese nitrate, manganese carbonate, etc. can be used. As the salt of Zn, zinc sulfate, zinc nitrate, etc. can be used. They may be used singly or in any combination.

The concentration of the Co salt in an aqueous solution dissolving the Co salt and the salt of the element M is, for example, 0.5 to 2 mol/L. The concentration of the salt of the element M is, for example, 0.01 to 0.32 mol/L.

The concentration of alkali in the aqueous alkaline solution to be fed into the solution is, for example, 10 to 50 wt %. As the alkali to be dissolved in the aqueous alkaline solution, sodium hydroxide, potassium hydroxide, lithium hydroxide, etc. can be used. The temperatures of the aqueous solution dissolving the Co salt and the salt of the element M and the aqueous alkaline solution are not specifically limited. For example, 20 to 60° C.

A hydroxide which is a coprecipitated product of Co and the element M is obtained by continuously adding dropwise the aqueous alkaline solution to the aqueous solution dissolving the Co salt and the salt of the element M such that the pH of the aqueous solution is controlled to the level at which Co and the element M are coprecipitated (normally, at not less than pH 8). The obtained hydroxide is filtrated, washed with water, dried and baked in an oxidizing atmosphere. Thereby, an oxide having the element M and Co uniformly distributed therein can be obtained.

(2) Step B

In Step B, a compound Y containing at least one element L selected from the group consisting of Al, Ca, Ba, Sr, Y and Zr, the compound X and a lithium compound are first mixed. Suitable examples of the compound Y containing the element L include a hydroxide of the element L, an oxide of the element L, a carbonate of the element L and a nitrate of the element L.

Examples of compound containing Al include aluminum hydroxide, aluminum oxide, aluminum nitrate, aluminum fluoride and aluminum sulfate.

Examples of compound containing Ca include calcium hydroxide, calcium oxide, calcium carbonate, calcium chloride and calcium nitrate.

Examples of compound containing Ba include barium hydroxide, barium sulfate, barium nitrate, barium oxide and barium chloride.

Examples of compound containing Sr include strontium hydroxide, strontium oxide, strontium carbonate, strontium chloride and strontium nitrate.

Examples of compound containing Y include yttrium hydroxide, yttrium oxide, yttrium carbonate, yttrium chloride and yttrium sulfate.

Examples of compound containing Zr include zirconium nitrate, zirconium hydroxide, zirconium oxide, zirconium carbonate, zirconium tetrachloride and zirconium sulfate.

Examples of the lithium compound include lithium carbonate, lithium hydroxide, lithium nitrate, lithium sulfate and lithium oxide.

Subsequently, a composite oxide containing Li, Co, the element M and the element L is prepared by heating the obtained mixture. In Step B, the mixture is preferably heated at not less than 600° C. and not higher than 1050° C. When the heating temperature is less than 600° C., the composite oxide containing Li, Co, the element M and the element L has low crystallinity. Accordingly, a battery produced using the composite oxide tends to have a small discharge capacity. Conversely, when the heating temperature exceeds 1050° C., the composite oxide containing Li, Co, the element M and the element L has a low specific surface area. Accordingly, a battery produced using the composite oxide tends to have low performance at high load.

Preferably, the mixture is preheated at a temperature of not less than 300° C. and not higher than 750° C. using a rotary kiln before heating the mixture at a temperature of not less than 600° C. and not higher than 1050° C. The preheating is preferably performed at a temperature lower than the temperature used in the subsequent heating by 100° C. or more. By such baking method involving two different steps, an active material having high crystallinity can be obtained, and the amount of residual unreacted matter can be reduced. A rotary kiln heats a mixture while the mixture is circulated. As such, the number of collision between the raw material particles can be increased, and the reactivity can be improved.

A description is now given of the negative electrode and the electrolyte used in the present invention.

As the negative electrode and the electrolyte, any materials for negative electrodes and electrolytes which are conventionally used for non-aqueous electrolyte secondary batteries can be used without any specific limitation.

As the main material for forming the negative electrode, lithium, a lithium alloy or a compound capable of absorbing and desorbing lithium ions (e.g., an intermetallic compound, carbon material, organic compound, inorganic compound, metal complex or organic polymer compound) can be used. They may be used singly or in any combination. Among them particularly preferred is a carbon material.

The carbon material preferably has an average particle size of 0.1 to 60 µm, particularly preferably 0.5 to 30 µm. The carbon material preferably has a specific surface area of 1 to 10 m$^2$/g. Particularly preferred is graphite in which the spacing ($d_{002}$) between the hexagonal carbon planes is 3.35 to 3.4 Å and the crystallite size in the c-axis direction (Lc) is not less than 100 Å.

The electrolyte preferably comprises a non-aqueous solvent and a lithium salt to be dissolved in the non-aqueous solvent. Examples of the non-aqueous solvent include: cyclic carbonic acid esters such as ethylene carbonate and propylene carbonate; non-cyclic carbonic acid esters such as dimethyl carbonate, diethyl carbonate, ethyl methyl carbonate; and cyclic carboxylic acid esters such as γ-butyrolactone and γ-valerolactone. The lithium salt is preferably $LiPF_6$, $LiBF_4$ or the like. They may be used singly or in any combination.

The shape of the battery is not specifically limited. The battery can have any shape such as cylindrical, flat or prismatic. In order to ensure safety even in the event of a malfunction, the battery is preferably equipped with an internal pressure release safety valve or current breaking safety valve.

The present invention will be described in further detail below with reference to EXAMPLEs.

EXAMPLE 1

First, an investigation was made on the ranges of the values of y and z in the composite oxides represented by the general formula: $Li_xMe_{1-y-z}M_yL_zO_2$. Positive electrode active materials in which Me was Co and the values of y and z were those listed in Table 1 were prepared. Using the positive electrode active materials, batteries An (n being an integer) of the present invention and comparative batteries Bn (n being an integer) were produced. Herein, the value of x was fixed to 1. As the separator, a commercially available 25 μm thick microporous film having a three-layered structure of PP/PE/PP (2300 manufactured by Celgard Inc., hereinafter referred to as separator C1) was used. The "PP" mentioned above means a monolayer film composed of PP alone. Likewise, the "PE" means a monolayer film composed of PE alone. Each monolayer film was drawn in one direction by uniaxial drawing, and had a thickness of about 8 μm.

(a) Production of Positive Electrode

Positive electrode active materials for batteries A1, A3 to A6, A15 to A20 and B3 to B7 were prepared by a coprecipitation method described below.

Step A

A metal salt aqueous solution dissolving cobalt sulfate and magnesium sulfate was prepared.

The concentration of the cobalt sulfate in the metal salt aqueous solution was 1 mol/L. The concentration of the magnesium sulfate was appropriately adjusted according to Table 1. While the metal salt aqueous solution maintained at 50° C. was stirred, an aqueous solution containing 30 wt % sodium hydroxide was added dropwise thereto such that the pH of the aqueous solution was 12 so as to precipitate a magnesium-containing cobalt hydroxide. The precipitate of the cobalt hydroxide was filtrated, washed with water, dried in air and baked at 400° C. for 5 hours. Thereby, a magnesium-containing cobalt oxide was obtained.

TABLE 1

| Battery | $LiCo_{1-y-z}M_yL_zO_2$ | | | | Separator | Rated battery capacity (mAh) | Recovery rate after constant voltage storage (%) | | |
|---|---|---|---|---|---|---|---|---|---|
| | M | y | L | z | | | 4.2 V | 4.3 V | 4.4 V |
| B1 | — | 0 | — | 0 | C1 | 1817 | 78 | 59 | 28 |
| B2 | — | 0 | Al | 0.01 | C1 | 1795 | 84 | 64 | 31 |
| A1 | Mg | 0.005 | Al | 0.01 | C1 | 1791 | 93 | 76 | 44 |
| A2 | Mg | 0.05 | Al | 0 | C1 | 1774 | 95 | 84 | 60 |
| A3 | Mg | 0.05 | Al | 0.005 | C1 | 1766 | 95 | 88 | 67 |
| A4 | Mg | 0.05 | Al | 0.01 | C1 | 1757 | 96 | 91 | 72 |
| A5 | Mg | 0.05 | Al | 0.05 | C1 | 1685 | 96 | 93 | 75 |
| B3 | Mg | 0.05 | Al | 0.1 | C1 | 1489 | 97 | 94 | 76 |
| A6 | Mg | 0.1 | Al | 0.01 | C1 | 1711 | 97 | 92 | 73 |
| B4 | Mg | 0.2 | Al | 0.01 | C1 | 1621 | 97 | 93 | 74 |
| A7 | Mg | 0.05 | Sr | 0.01 | C1 | 1745 | 95 | 88 | 68 |
| A8 | Mg | 0.05 | Zr | 0.01 | C1 | 1752 | 96 | 90 | 70 |
| A9 | Mg | 0.05 | Ca | 0.01 | C1 | 1739 | 93 | 84 | 63 |
| A10 | Mg | 0.05 | Ba | 0.01 | C1 | 1742 | 93 | 83 | 62 |
| A11 | Mg | 0.05 | Y | 0.01 | C1 | 1749 | 94 | 85 | 63 |
| A12 | Ti | 0.05 | Al | 0.01 | C1 | 1750 | 95 | 89 | 69 |
| A13 | Zn | 0.05 | Al | 0.01 | C1 | 1746 | 94 | 87 | 65 |
| A14 | Mn | 0.05 | Al | 0.01 | C1 | 1762 | 95 | 79 | 56 |
| A15 | Mg | 0.05 | Al | 0.001 | C1 | 1770 | 95 | 87 | 64 |
| A16 | Mg | 0.05 | Al | 0.002 | C1 | 1768 | 95 | 88 | 66 |
| A17 | Mg | 0.05 | Al | 0.03 | C1 | 1723 | 96 | 92 | 74 |
| A18 | Mg | 0.01 | Al | 0.01 | C1 | 1786 | 94 | 80 | 52 |
| A19 | Mg | 0.03 | Al | 0.01 | C1 | 1772 | 95 | 86 | 64 |
| A20 | Mg | 0.08 | Al | 0.01 | C1 | 1729 | 96 | 92 | 73 |
| B5 | Mg | 0.004 | Al | 0.01 | C1 | 1792 | 86 | 68 | 35 |
| B6 | Mg | 0.15 | Al | 0.01 | C1 | 1642 | 97 | 92 | 73 |
| B7 | Mg | 0.05 | Al | 0.06 | C1 | 1648 | 97 | 93 | 75 |

Step B

The obtained magnesium-containing cobalt oxide, aluminum hydroxide and lithium carbonate were mixed at a predetermined molar ratio according to Table 1. The molar ratio of Li:(Co+Mg+Al) was 1:1. This mixture was fed into a rotary kiln, and preheated at 650° C. in an air atmosphere for 10 hours. Subsequently, the preheated mixture was heated to 950° C. in an electric furnace in 2 hours, and then baked at 950° C. for 10 hours. The resultant was pulverized into powders having a 50% cumulative particle size of 10 μm, which was obtained by laser diffractometry. Thereby, a positive electrode active material was prepared.

The positive electrode active material for the battery A2 was prepared in the same manner as described in Steps A and B except that after Step A, Step B was performed without addition of aluminum hydroxide.

The positive electrode active material for the battery B1 was prepared in the same manner as described in Steps A and B except that Step A was performed without addition of magnesium sulfate and Step B was performed without addition of aluminum hydroxide.

The positive electrode active material for the battery B2 was prepared in the same manner as described in Steps A and B except that Step A was performed without addition of magnesium sulfate.

The positive electrode active materials for the batteries A7 to A11 were prepared in the same manner as described in Steps A and B except that after Step A, Step B was performed using, instead of aluminum hydroxide, a hydroxide of a predetermined element (calcium hydroxide, barium hydroxide), a carbonate of a predetermined element (strontium carbonate, yttrium carbonate) or a nitrate of a predetermined element (zirconium nitrate).

The positive electrode active materials for the batteries A12 to A14 were prepared in the same manner as described in Steps A and B except that Step A was performed using, instead of magnesium sulfate, a sulfate of a predetermined element (manganese sulfate, zinc sulfate or titanium sulfate).

A positive electrode material mixture was prepared by mixing 100 parts by weight of the given positive electrode active material with 3 parts by weight of acetylene black as a conductive material and 3 parts by weight of polyvinylidene fluoride as a binder. The positive electrode material mixture was then dispersed in N-methyl-2-pyrrolidone to obtain a positive electrode material mixture paste in the form of a slurry. The positive electrode material mixture paste was applied onto both surfaces of a 20 μm thick aluminum foil serving as a current collector so as to have a predetermined dry weight, and subsequently dried, rolled and cut into a predetermined size. Thereby, a positive electrode having a thickness of 170 μm was produced.

(b) Production of Negative Electrode

Flake graphite was pulverized and sieved to have an average particle size of about 20 μm. To 100 parts by weight of the flake graphite were added with 3 parts by weight of styrene/butadiene rubber as a binder and 100 parts by weight of an aqueous solution containing 1 wt % carboxymethyl cellulose to prepare a negative electrode material mixture paste in the form of a slurry. This negative electrode material mixture paste was applied onto both surfaces of a 15 μm thick copper foil so as to have a predetermined dry weight, and subsequently dried, rolled and cut into a predetermined size. Thereby, a negative electrode having a thickness of 165 μm was produced.

(c) Assembly of Battery

Using the given positive electrode and the negative electrode produced above, a cylindrical non-aqueous electrolyte secondary battery having a diameter of 18 mm and a height of 65 mm was assembled. FIG. 1 shows a vertical cross-sectional view of a cylindrical battery produced in this example. The battery was assembled as follows.

First, an end of a positive electrode lead 5a made of aluminum was connected to the current collector of the given positive electrode 5, and an end of a negative electrode lead 6a made of nickel was connected to the current collector of a negative electrode 6. The positive electrode 5 and the negative electrode 6 were spirally wound with a separator 7 (i.e., separator C1) interposed therebetween. Thereby, a jelly-roll type electrode group was formed. On the top and bottom of the electrode group were placed insulating plates 8a and 8b made of PP. The other end of the negative electrode lead 6a was welded to a battery case 1 made of iron plated with nickel. The other end of the positive electrode lead 5a was welded to a sealing plate 2 equipped with an internal pressure-activated safety valve. The electrode group was then housed into the battery case 1. Subsequently, a non-aqueous electrolyte was injected into the battery case while reducing the pressure within the battery case 1. Finally, the opening of the battery case 1 was sealed using the sealing plate 2 with a gasket 3 disposed therebetween, with the edge of the opening crimping thereon. Thereby, a battery was produced.

The non-aqueous electrolyte used here was prepared as follows. To 100 parts by weight of a solvent mixture of ethylene carbonate and ethyl methyl carbonate at a volume ratio of 1:3 was added 2 parts by weight of vinylene carbonate. Then, $LiPF_6$ was dissolved therein at a concentration of 1.0 mol/L.

[Rated Battery Capacity]

Each battery was subjected to charge/discharge cycle test at an ambient temperature of 20° C., and evaluated in terms of rated battery capacity. In the charge/discharge cycle test, charge was performed at a constant current of 400 mA until the battery voltage reached 4.2 V and then at a constant voltage of 4.2 V for 2 hours. Discharge was performed at a constant current of 400 mA until the battery voltage reached 3.0 V. Under the charge/discharge conditions described above, charge/discharge cycle test was performed. The battery capacity estimated from the discharge at the second cycle was denoted as rated battery capacity. The results are shown in Table 1.

As can be seen from Table 1, the rated battery capacity tends to be low when Mg or Al is added. This is because Mg and Al do not contribute to charge/discharge reaction of the battery, in other words, an oxidation/reduction reaction of the metal elements contained in the positive electrode active material. As the amount thereof is increased, the rated battery capacity decreases. Ideally, the batteries of the present invention produced in this example needed to have a rated battery capacity of 1650 mAh for practical use. Considering the above, in the general formula: $Li_xMe_{1-y-z}M_yL_zO_2$ the y and z that represent the amount of M preferably should satisfy $0.005 \leq y \leq 0.1$ and $0 \leq z \leq 0.05$.

[Recovery Rate after Constant Voltage Storage]

In order to evaluate the degree of degradation of discharge characteristic during high temperature/high voltage storage, recovery rate after constant voltage storage was estimated. Each battery was cycled twice under the same charge/discharge conditions described above, and then the rated battery capacity was estimated. The battery was charged at a constant current of 400 mA in an environment of 20° C. until the battery voltage reached 4.2 V, and charged at a constant voltage of 4.2 V for 2 hours.

The battery was then subjected to constant current discharge at a current value equal to a 2 hour discharge rate of the estimated rated battery capacity (equivalent to 0.5 C) (e.g., if the rated battery capacity is 1000 mAh, 500 mA) until the battery voltage reached 3.0 V. The discharge battery capacity obtained at this time was referred to as discharge capacity at the third cycle.

The battery was then allowed to stand at an ambient temperature of 60° C. for 6 hours. After confirming that the battery temperature reached 60° C., the battery was charged at a constant current of 400 mA at an ambient temperature of 60° C. until the battery voltage reached a level shown in Table 1 (4.2 V, 4.3 V or 4.4 V), and then charged at a predetermined constant voltage for 72 hours.

After the charging was completed, the battery was discharged at a current value of 400 mA at an ambient temperature of 60° C. until the battery voltage reached 3.0 V, and then allowed to stand at an ambient temperature of 20° C. for 6 hours. After confirming that the battery temperature reached 20° C., the battery was charged at a constant current of 400 mA until the battery voltage reached 4.2 V, and then charged at a constant voltage of 4.2 V for 2 hours.

Thereafter, the battery was subjected to constant current discharge at a current value equal to a 2 hour discharge rate of the estimated rated battery capacity (equivalent to 0.5 C) until the battery voltage reached 3.0 V. The discharge battery capacity obtained at this time was referred to as discharge capacity at the fifth cycle.

The recovery rate after constant voltage storage is a ratio of the discharge capacity at the fifth cycle to that at the third cycle, in other words, a value calculated by the equation:

recovery rate after constant voltage storage=(discharge capacity at the fifth cycle/discharge capacity at the third cycle)×100(%).

The results are shown in Table 1.

As can be seen from the results of Table 1, compared to the comparative battery B1, the batteries of the present invention produced in this example containing Mg and Al exhibited an improved recovery rate after constant voltage storage (hereinafter simply referred to as recovery rate) when charged to 4.2 V (i.e., a voltage level typically used for currently available portable personal computers).

Compared to the comparative battery B1, the comparative battery B2 having only Al added thereto exhibited an improvement in recovery rate after 4.2 V constant voltage storage, but it exhibited a low improvement when charged to a high voltage of 4.3 V or 4.4 V. On the other hand, the battery A2 having only Mg added thereto exhibited good results even when charged to a high voltage of 4.3 V or 4.4 V. The foregoing results show that Mg is an essential element for the present invention, and that the combined use of Al with Mg produces a synergistic effect.

As a means of achieving a higher capacity, the charge voltage is expected to be higher (e.g., 4.3 V or 4.4 V) in the future. Considering this, the recovery rate is ideally not less than 70% when charged to a voltage to be used in the future. The results of Table 1 indicate that the batteries A1 to A20 of this example are usable at 4.3 V and that the batteries A4 to A6, A8, A17 and A20 of this example are usable also at 4.4 V.

The experimental results described above show that a preferred amount of Mg is $0.005 \leq y \leq 0.1$, more preferably $0.05 \leq y \leq 0.1$, and that a preferred amount of Al is $0 \leq z \leq 0.05$, more preferably $0.01 \leq z \leq 0.05$.

EXAMPLE 2

An investigation was made on the effect of the distribution conditions of the element M and the element L in the particle of positive electrode active material on the degradation of discharge characteristic during high temperature/high voltage storage. In this example, positive electrode active materials represented by $Li_xMe_{1-y-z}M_yL_zO_2$ where the element Me was Co, the element M was Mg, the element L was Al, x=1, y=0.05 and z=0.01 were prepared. The element M and the element L were added to the positive electrode active material by methods shown in Table 2 (coprecipitation method or external addition method). Using the positive electrode active materials, batteries A4, A21 and A22 were produced. The battery A4 was the same as the battery A4 produced in EXAMPLE 1. Step A corresponds to coprecipitation method and Step B corresponds to external addition method. As the separator, a separator C1 was used.

The positive electrode active material for the battery A21 was prepared by a coprecipitation method described below.

A metal salt aqueous solution dissolving cobalt sulfate, magnesium sulfate and aluminum sulfate was prepared. The concentration of the cobalt sulfate in the metal salt aqueous solution was 1 mol/L. The concentrations of the magnesium sulfate and aluminum sulfate were appropriately adjusted such that y=0.05 and z=0.01 in the resulting positive electrode active material.

While the metal salt aqueous solution maintained at 50° C. was stirred, an aqueous solution containing 30 wt % sodium hydroxide was added dropwise thereto such that the pH of the aqueous solution was 12 so as to precipitate a magnesium/aluminum containing cobalt hydroxide.

The precipitate of the cobalt hydroxide was filtrated, washed with water, dried in air and baked at 400° C. for 5 hours. Thereby, a magnesium/aluminum-containing cobalt oxide was obtained.

The obtained magnesium/aluminum-containing cobalt oxide and lithium carbonate were mixed such that the molar ratio of Li:(Co+Mg+Al) was 1:1. This mixture was fed into a rotary kiln, and preheated in an air atmosphere at 650° C. for 10 hours. The preheated mixture was then heated to 950° C. in an electric furnace in 2 hours and then baked at 950° C. for 10 hours. The resultant was pulverized into powders having a 50% cumulative particle size of 10 μm obtained by laser diffractometry. Thereby, the positive electrode active material was obtained.

The positive electrode active material for the battery A22 was prepared by an external addition method described below.

Cobalt oxide, magnesium carbonate, aluminum hydroxide and lithium carbonate were mixed such that the molar ratio of Li:Co:Al:Mg was 1:0.94:0.01:0.05. This mixture was fed into a rotary kiln, and preheated in an air atmosphere at 650° C. for 10 hours. The preheated mixture was then heated to 950° C. in an electric furnace in 2 hours and then baked at 950° C. for 10 hours. The resultant was pulverized into powders having a 50% cumulative particle size of 10 μm obtained by laser diffractometry. Thereby, the positive electrode active material was obtained.

The positive electrode active materials for the batteries A4, A21 and A22 were analyzed for the distribution condition of Mg and Al by secondary ion mass spectrometry (SIMS), time of flight mass spectrometry (TOF-SIMS), X-ray photoelectron spectroscopy (ESCA), Auger spectroscopy and X-ray microanalysis (EPMA).

TABLE 2

| | $LiCo_{0.94}Mg_{0.05}Al_{0.01}O_2$ | | | Rated battery | Recovery rate after constant voltage storage (%) | | |
|---|---|---|---|---|---|---|---|
| Battery | Mg addition method | Al addition method | Separator | capacity (mAh) | 4.2 V | 4.3 V | 4.4 V |
| A4 | Coprecipitation method | External addition method | C1 | 1757 | 96 | 91 | 72 |
| A21 | Coprecipitation method | Coprecipitation method | C1 | 1740 | 95 | 89 | 68 |
| A22 | External addition method | External addition method | C1 | 1752 | 95 | 81 | 56 |

[Analysis of Cross-section of Positive Electrode Active Material Particle]

Each positive electrode active material was mixed with epoxy resin, which was then cured. The cured product was cut and polished. Thereby, a sample for measurement was prepared. The sample was analyzed by surface analysis using the above analyzing methods to determine the elemental distributions and the concentration distributions of the surface portion and the center portion.

[Analysis of Depth Direction from Surface of Positive Electrode Active Material Particle]

Sputtering was employed to analyze the particle along the depth direction from the particle surface. The analysis of particle surface was done mainly by TOF-SIMS measurement.

The results showed that, in the positive electrode active material for the battery A4, Al was distributed in the surface portion of the active material particle (i.e., in a region within 0.3r from the surface of the positive electrode active material particle when the radius of the particle is r) at a concentration about twice higher than that in the center portion (i.e., in a region within 0.3r from the center of the positive electrode active material particle when the radius of the particle is r). On the other hand, Mg was distributed uniformly in the active material particle.

In the positive electrode active material for the battery A21, Mg and Al were distributed uniformly in the active material particle. In the positive electrode active material for the battery A22, on the other hand, Al was distributed in the surface portion of the active material particle (i.e., in a range within 0.3r from the surface of the positive electrode active material particle when the radius of the particle is r) at a concentration about twice higher than that in the center portion (i.e., in a region within 0.3r from the center of the positive electrode active material particle when the radius of the particle is r). Mg was distributed in the surface portion of the active material particle at a concentration about 1.5 times higher than that in the center portion. In short, both Al and Mg were distributed more in the surface portion of the active material particle.

Using these positive electrode active materials, cylindrical non-aqueous electrolyte secondary batteries were produced and evaluated in the same manner as in EXAMPLE 1. The results are shown in Table 2.

Compared to the battery A4 containing the positive electrode active material having Al added thereto by the external addition method, the battery A21 containing the positive electrode active material having Al added thereto by the coprecipitation method had a lower rated battery capacity. Because the positive electrode active material used in the battery A21 was prepared by coprecipitating Co, Mg and Al simultaneously, sulfate ions incorporated into the active material during the preparation thereof remained in the synthesized active material, and presumably this caused the capacity degradation.

The battery A21 had a lower recovery rate after constant voltage storage than the battery A4. This tendency is particularly pronounced when the charge voltage is 4.3 V and 4.4 V. Presumably, this is because the amount of Al present in the surface portion of the positive electrode active material was smaller than that of the positive electrode active material used in the battery A4, and the release of oxygen was not prevented sufficiently during high temperature/high voltage storage.

The battery A22 containing the positive electrode active material having Mg added thereto by the external addition method had almost the same rated battery capacity as that of the battery A4 containing the positive electrode active material having Mg added thereto by the coprecipitation method, but the recovery rate after constant voltage storage of the battery A22 was lower. This tendency is particularly pronounced when the charge voltage is 4.3 V and 4.4 V. This is because Mg was not dispersed uniformly in the positive electrode active material used in the battery A22, so that the active material particle was partially broken during high voltage (4.3 V or 4.4 V)/high temperature storage, and oxygen was easily released.

The experimental results described above show that it is preferred that Mg is distributed uniformly in the positive electrode active material particle and Al is distributed more in the surface portion than the inside of the particle.

EXAMPLE 3

An investigation was made on the effect of the combination of the positive electrode active material composition and the material of the separator that faces the positive electrode on the degradation of discharge characteristic during high temperature/high voltage storage. In this example, a battery A4 of the present invention and comparative batteries B1, B8 and B9 were produced using the combinations of positive electrode active material and separator listed in Table 3. The batteries A4 and B1 were the same as the batteries produced in EXAMPLE 1.

TABLE 3

| Battery | Positive electrode active material | Separator | Rated battery capacity (mAh) | Recovery rate after constant voltage storage (%) | | |
|---|---|---|---|---|---|---|
| | | | | 4.2 V | 4.3 V | 4.4 V |
| A4 | $LiCo_{0.94}Mg_{0.05}Al_{0.01}O_2$ | C1 | 1757 | 96 | 91 | 72 |
| B8 | $LiCo_{0.94}Mg_{0.05}Al_{0.01}O_2$ | C2 | 1758 | 80 | 62 | 15 |
| B1 | $LiCoO_2$ | C1 | 1817 | 78 | 59 | 28 |
| B9 | $LiCoO_2$ | C2 | 1819 | 71 | 33 | 5 |

As the battery B8, a cylindrical non-aqueous electrolyte secondary battery was produced in the same manner as in EXAMPLE 1 except that the same positive electrode active material as used in the battery A4 was used as the positive electrode active material, and that a commercially available 27 μm thick microporous film having a monolayer structure composed of PE alone (k849 manufactured by Celgard Inc., hereinafter referred to as separator C2) was used as the separator.

As the battery B9, a cylindrical non-aqueous electrolyte secondary battery was produced in the same manner as in EXAMPLE 1 except that the same positive electrode active material as used in the battery B1 was used as the positive electrode active material, and that the separator C2 was used as the separator.

These batteries were evaluated in the same manner as in EXAMPLE 1. The results are shown in Table 3.

The comparative battery B9 containing $LiCoO_2$ as the positive electrode active material and the separator C2 composed of PE alone exhibited very low recovery rates compared to the battery A4 of the present invention. Presumably, this is because the release of oxygen from the positive electrode active material and the release of hydrogen from the separator were not prevented, so that $H_2O$ was produced, which formed a thick film layer on the negative electrode surface.

The comparative batteries B8 and B1 also exhibited lower recovery rates than the battery A4 of the present invention. In the battery B8, the release of oxygen from the positive electrode was prevented, but the release of hydrogen from the separator was not prevented. In the battery B1, on the other hand, the release of hydrogen from the separator was prevented, but the release of oxygen from the positive electrode was not prevented. As such, presumably, the amount of produced $H_2O$ was larger than that of the battery A4. As a result, the recovery rates were lower.

The experimental results described above show that, in order to obtain favorable recovery rates, it is necessary to use an active material containing the element M and the element L ($LiCo_{0.94}Mg_{0.05}Al_{0.01}O_2$) as the positive electrode active material and a microporous film in which the positive electrode-side monolayer film is made of PP as the separator.

EXAMPLE 4

An investigation was made on the amount of PP in the positive electrode-side monolayer film necessary to prevent the oxidation of the separator when charged to a high voltage at a high temperature. For the investigation, multilayer films were produced as separators C3 to 7. The multilayer films had a three-layered structure of A/B/A. As the monolayer film A, a blend polymer of PP and PE was used. The ratio of PP and PE mixed in the blend polymer was a value listed in Table 4. Likewise, as the monolayer film B, PE was used. Using the above, batteries A23 to 27 of the present invention were produced.

TABLE 4

| Separator | Composition of monolayer film A | | Total thickness of separator (μm) | Monolayer film thickness (μm) | | Air permeability (sec/100 ml) | Average pore size of monolayer film (μm) | | Pore closing temp. (° C.) |
|---|---|---|---|---|---|---|---|---|---|
| | PP (wt %) | PE (wt %) | | A | B | | A | B | |
| C3 | 100 | 0 | 26.1 | 6.0 | 14.1 | 480 | 0.04 | 0.06 | 134 |
| C4 | 80 | 20 | 24.6 | 4.9 | 14.8 | 450 | 0.05 | 0.07 | 134 |
| C5 | 60 | 40 | 24.4 | 4.6 | 15.2 | 430 | 0.06 | 0.07 | 134 |
| C6 | 40 | 60 | 25.4 | 5.0 | 15.4 | 420 | 0.06 | 0.08 | 134 |
| C7 | 20 | 80 | 25.2 | 5.3 | 14.6 | 420 | 0.06 | 0.08 | 134 |

(a) Production of Separator C3

As the raw material for the monolayer film A, 35 parts by weight of PP and 65 parts by weight of liquid paraffin were melted and mixed. Likewise, as the raw material for the monolayer film B, 45 parts by weight of PE and 55 parts by weight of liquid paraffin were melted and mixed. The melted and mixed raw materials were respectively extruded from two extruders equipped with a T-die for 3 layer coextrusion at the tip thereof. Thereby, a 1000 μm thick sheet having a three-layered structure was produced. The amounts of the resins extruded from the two extruders were adjusted such that the resulting monolayer films A and B had thicknesses listed in Table 4. This sheet was drawn in two directions (both horizontally and vertically) simultaneously in a tenter machine heated to 116° C., which was then immersed in methyl ethyl ketone to extract and remove the liquid paraffin, followed by drying. Thereby, a separator C3 having a thickness of 26.1 μm was obtained.

(b) Production of Separator C4

A separator C4 having a thickness of 24.6 μm was produced in the same manner as the separator C3 was produced except that the raw material for the monolayer film A was prepared by melting and mixing 32 parts by weight of PP, 8 parts by weight of PE and 60 parts by weight of liquid paraffin.

(c) Production of Separator C5

A separator C5 having a thickness of 24.4 μm was produced in the same manner as the separator C3 was produced except that the raw material for the monolayer film A was prepared by melting and mixing 24 parts by weight of PP, 16 parts by weight of PE and 60 parts by weight of liquid paraffin.

(d) Production of Separator C6

A separator C6 having a thickness of 25.4 μm was produced in the same manner as the separator C3 was produced except that the raw material for the monolayer film A was prepared by melting and mixing 16 parts by weight of PP, 24 parts by weight of PE and 60 parts by weight of liquid paraffin.

(e) Production of Separator C7

A separator C7 having a thickness of 25.2 μm was produced in the same manner as the separator C3 was produced except that the raw material for the monolayer film A was prepared by melting and mixing 8 parts by weight of PP, 32 parts by weight of PE and 60 parts by weight of liquid paraffin.

Various characteristics of the obtained separators C3 to C7 were examined by the following methods. The evaluation results are shown in Table 4.

[Film Thickness]

An image of the cross-section of each separator having a three-layered structure of A/B/A was taken by a scanning electron microscope (S-4500 manufactured by Hitachi, Ltd.). From the obtained electron microscope image, the total thickness of the separator, the thickness of the monolayer film A and that of the monolayer film B were determined.

[Air Permeability]

Using a Gurley type densometer (manufactured by Toyo Seiki Seisaku-sho, Ltd.), the time required for 100 mL of air to flow through the separator was measured according to JIS P8117.

[Average Pore Size]

From each separator having a three-layered structure of A/B/A, the monolayer film A and the monolayer film B were physically peeled from each other. Then, the pore size distribution was measured by mercury porosimetry using a mercury porosimeter (Autopore III9410 manufactured by SHIMADZU CORPORATION), after which the average pore size was estimated based on the total pore volume of each film.

[Pore Closing Temperature]

The pore closing temperature was measured by a known method as disclosed in Japanese Laid-Open Patent Publication No. 2002-321323 except that an electrolyte was prepared by dissolving $LiPF_6$ in a solvent mixture composed of ethylene carbonate and propylene carbonate at a volume ratio of 1:1 at a $LiPF_6$ concentration of 1 mol/L. More specifically, a separator impregnated with the electrolyte was sandwiched with a pair of flat electrodes, which was then heated at a rate of 2° C./min, during which the change of electrical resistance of the separator was measured. The temperature at which the electrical resistance level reached 1000Ω was defined as pore closing temperature. The electrical resistance level was measured using an alternating current of 1 kHz.

Subsequently, cylindrical non-aqueous electrolyte secondary batteries were produced in the same manner as in EXAMPLE 1 except that the same positive electrode active material as used in the battery A4 of EXAMPLE 1, namely $LiCo_{0.94}Mg_{0.05}Al_{0.01}O_2$ was used, and that the separators C3 to C7 were used.

The obtained batteries were evaluated in the same manner as in EXAMPLE 1. The results are shown in Table 5. Additionally, capacity retention rate was measured in order to evaluate the cycle characteristic of the batteries at 45° C.

[Capacity Retention Rate]

After the rated battery capacity was measured, each battery was subjected to charge/discharge cycle test at an ambient temperature of 45° C. In the charge/discharge cycle test, for charging, constant current charge was performed at a current value equal to an 1 hour discharge rate of the rated battery capacity (equivalent to 1 C) until the battery voltage reached 4.2 V. Then, charge was further performed at a constant voltage of 4.2 V for 2 hours. For discharging, constant current discharge was performed at a current value equal to an 1 hour discharge rate of the rated battery capacity (equivalent to 1 C) until the battery voltage reached 3.0 V.

Under the charge/discharge conditions described above, the battery was cycled 500 times. Thereafter, under the conditions used for the evaluation of rated battery capacity described previously, at an ambient temperature of 20° C., the battery was cycled once. The discharge capacity obtained at this time was denoted as rated battery capacity after cycle test. The capacity retention rate was a ratio of the rated battery capacity after cycle test at 45° C. to the initial rated battery capacity, in other words, a value calculated by the equation:

capacity retention rate=(rated battery capacity after cycle test/rated battery capacity before cycle test)×100(%).

The results are shown in Table 5.

main chain of PE does not rotate freely. As a result, the dehydrogenation reaction does not occur easily.

The battery A23 containing the microporous film having a three-layered structure of A/B/A in which the monolayer film A comprises PP alone exhibited slightly low cycle characteristic (capacity retention rate) at 45° C. Although the cause is not known clearly, presumably, the monolayer film A composed of PP alone and the monolayer film A composed of a blend polymer of PP and PE have different microporous structures, making a difference in performance. Meanwhile, the capacity retention rate slightly decreased also when the amount of PP contained in the monolayer film A was not greater than 40 wt %. Presumably, this is because the cycle test was performed in a high temperature environment of 45° C., so that the separator was oxidized.

The experimental results described above show that the use of a monolayer film composed of PP alone, preferably, a monolayer film composed of a blend polymer of PP and PE with a PP amount of not less than 60 wt % as the positive electrode-side monolayer film can provide a non-aqueous electrolyte secondary battery that can prevent the oxidation of the separator very effectively, improve cycle characteristic at a high temperature and exhibit sufficient discharge characteristic even after high temperature/high voltage (4.2 V or higher) storage.

In the separator C3 having the monolayer film A composed of PP alone, the viscosity was high in the melting step. As such, if the separator C3 is mass-produced by the wet-type biaxial extrusion method used in this example, the drawing step will be time-consuming, which might decrease the production speed. In contrast, a blend polymer containing PE in an amount of not less than 5 wt % has a low viscosity, which means the production speed can be improved. Accordingly, considering the mass production speed, a blend polymer con-

TABLE 5

| Battery | Positive electrode active material | Separator | Rated battery capacity (mAh) | Recovery rate after constant voltage storage (%) | | | Cycle characteristics at 45° C. Capacity retention rate (%) |
|---|---|---|---|---|---|---|---|
| | | | | 4.2 V | 4.3 V | 4.4 V | |
| A23 | $LiCo_{0.94}Mg_{0.05}Al_{0.01}O_2$ | C3 | 1755 | 96 | 91 | 72 | 75 |
| A24 | $LiCo_{0.94}Mg_{0.05}Al_{0.01}O_2$ | C4 | 1757 | 96 | 90 | 71 | 85 |
| A25 | $LiCo_{0.94}Mg_{0.05}Al_{0.01}O_2$ | C5 | 1758 | 95 | 89 | 70 | 87 |
| A26 | $LiCo_{0.94}Mg_{0.05}Al_{0.01}O_2$ | C6 | 1756 | 85 | 65 | 17 | 81 |
| A27 | $LiCo_{0.94}Mg_{0.05}Al_{0.01}O_2$ | C7 | 1757 | 82 | 63 | 16 | 79 |

FIG. 2 shows the relationship between the amount of PP contained in a monolayer film A and the recovery rate when charged to 4.2 V, 4.3 V and 4.4 V. As can be seen from FIG. 2, the recovery rate was improved when the amount of PP was 60 wt % or greater regardless of the charge voltage.

The above results indicate that, as long as the monolayer film that faces the positive electrode is a blend polymer of PP and PE with an amount of PP of not less than 60 wt %, even if the monolayer film does not comprise propylene alone, the oxidation of the separator can be prevented very effectively. Although the reason why the oxidation of a blend polymer of PE and PP is prevented is not known clearly, it is presumed that, in a mixture of PP and PE for the monolayer film, due to steric hindrance by the methyl group contained in PP, the taining PE in an amount of not less than 5 wt % is preferably used.

EXAMPLE 5

An investigation was made on the need of a monolayer film composed mainly of PE in the separator of the present invention having a multilayer structure from the viewpoint of shutdown characteristic. For the investigation, multilayer films were produced as separators C8 to C10. The multilayer films had a three-layered structure of A/B/A. As the monolayer film A, a blend polymer of PP and PE was used. The ratio of PP and PE mixed in the blend polymer was 80:20 at a weight ratio. As the monolayer film B, a blend polymer of PP and PE was used. The ratio of PP and PE mixed in the polymer blend was a value listed in Table 6. Using the separator C4 used in EXAMPLE 4 and the separators C8 to C10, batteries A24, A28 to 30 of the present invention were produced. The battery A24 was the same one as produced in EXAMPLE 4.

prepared by melting and mixing 28 parts by weight of PP, 7 parts by weight of PE and 65 parts by weight of liquid paraffin.

The obtained separators C8 to C10 were evaluated in the same manner as in EXAMPLE 4. The evaluation results are shown in Table 6. The pore closing temperature increased as the ratio of PP contained in the monolayer film B was increased.

TABLE 6

| Separator | Composition of monolayer film B PP (wt %) | PE (wt %) | Total thickness of separator (μm) | Monolayer film thickness (μm) A | B | Air permeability (sec/100 ml) | Average pore size of monolayer film (μm) A | B | Pore closing temp. (° C.) |
|---|---|---|---|---|---|---|---|---|---|
| C8 | 20 | 80 | 24.8 | 4.8 | 15.2 | 460 | 0.05 | 0.06 | 140 |
| C9 | 40 | 60 | 25.3 | 5.1 | 15.1 | 490 | 0.04 | 0.06 | 142 |
| C10 | 80 | 20 | 25.8 | 4.4 | 17.0 | 510 | 0.04 | 0.05 | 154 |

(a) Production of Separator C8

As the raw material for the monolayer film A, 32 parts by weight of PP, 8 parts by weight of PE and 60 parts by weight of liquid paraffin were melted and mixed. Likewise, as the raw material for the monolayer film B, 9 parts by weight of PP, 36 parts by weight of PE and 55 parts by weight of liquid paraffin were melted and mixed. The melted and mixed raw materials were respectively extruded from two extruders equipped with a T-die for 3 layer coextrusion at the tip thereof. Thereby, a 1000 μm thick sheet having a three-layered structure was produced. The amounts of the resins extruded from the two extruders were adjusted such that the resulting monolayer films A and B had thicknesses listed in Table 4. This sheet was drawn in two directions (both horizontally and vertically) simultaneously in a tenter machine heated to 116° C., which was then immersed in methyl ethyl ketone to extract and remove the liquid paraffin, followed by drying. Thereby, a separator C8 having a thickness of 24.8 μm was obtained.

(b) Production of Separator C9

A separator C9 having a thickness of 25.3 μm was produced in the same manner as the separator C8 was produced except that the raw material for the monolayer film B was prepared by melting and mixing 18 parts by weight of PP, 27 parts by weight of PE and 55 parts by weight of liquid paraffin.

Subsequently, cylindrical non-aqueous electrolyte secondary batteries were produced in the same manner as in EXAMPLE 1 except that the same positive electrode active material as used in the battery A4 of EXAMPLE 1, namely $LiCo_{0.94}Mg_{0.05}Al_{0.01}O_2$ was used, and that the separators C4, C8 to C10 were used.

The rated battery capacity and the recovery rate of the obtained batteries were measured in the same manner as in EXAMPLE 1. Also, the batteries were subjected to an external short-circuit test described below. The results are shown in Table 7.

[External Short Circuit Test]

Each battery in a charged state was short-circuited at an ambient temperature of 20° C. using a 30 mΩ external circuit. A thermocouple connected to a thermometer was fixed on a side of the battery case with aramid tape. Changes in the battery temperature were continuously measured from the beginning of the short-circuit, and the maximum temperature of the battery was estimated, which was used as an index of safety. The charged state was obtained by charging each battery at a constant current of 400 mA until the battery voltage reached 4.2 V, and then at a constant voltage of 4.2 V for 2 hours.

TABLE 7

| Battery | Positive electrode active material | Separator | Rated battery capacity (mAh) | Recovery rate after constant voltage storage (%) 4.2 V | 4.3 V | 4.4 V | External short-circuit test Maximum temp. (° C.) |
|---|---|---|---|---|---|---|---|
| A24 | $LiCo_{0.94}Mg_{0.05}Al_{0.01}O_2$ | C4 | 1757 | 96 | 90 | 71 | 138 |
| A28 | $LiCo_{0.94}Mg_{0.05}Al_{0.01}O_2$ | C8 | 1755 | 96 | 89 | 70 | 145 |
| A29 | $LiCo_{0.94}Mg_{0.05}Al_{0.01}O_2$ | C9 | 1756 | 95 | 89 | 70 | 151 |
| A30 | $LiCo_{0.94}Mg_{0.05}Al_{0.01}O_2$ | C10 | 1753 | 95 | 87 | 69 | 166 |

(c) Production of Separator C10

A separator C10 having a thickness of 25.8 μm was produced in the same manner as the separator C8 was produced except that the raw material for the monolayer film B was No ignition or smoke was observed in the batteries shown in Table 7. After the batteries reached their maximum temperatures, their battery temperatures eventually decreased to 20° C.

FIG. 3 shows the relationship between the pore closing temperature of the separators C4, C8 to C10 and the maximum temperature when the batteries containing those separators were externally short-circuited. FIG. 4 shows relationship between the PP content (wt %) of the monolayer films B of the separators C4, C8 to C10 and the maximum temperature when the batteries containing those separators were externally short-circuited.

FIG. 3 indicates that the maximum temperature during short-circuit condition increased with the increase of the pore closing temperature of the separators. It also indicates that, from the viewpoint of safety, the battery temperature during short-circuit condition is preferably not greater than 150° C., more preferably not greater than 145° C. To that end, the pore closing temperature is preferably set at not greater than 140° C.

FIG. 4 indicates that the maximum temperature during short-circuit condition increased with the increase of the PP content of the monolayer film B. This is because the micropore shape of the separators was maintained at a higher temperature as the content of PP having a higher melting point than PE was increased. The shut-down characteristic degrades with the increase of the PP content. As such, it is clear from FIG. 4 that, in order to achieve a battery temperature during short-circuit condition of not greater than 145° C. when using a blend polymer of PP and PE, the PP content of the monolayer film B is preferably set at not greater than 20 wt %.

The experimental results described above show that it is possible to provide a non-aqueous electrolyte secondary battery with high safety by incorporating at least one monolayer film having a pore closing temperature of not greater than 140° C. into a separator comprising a plurality of laminated monolayer films.

As mentioned above, from the viewpoint of using the battery in a high temperature environment, the pore closing temperature is preferably set at least 110° C. or higher. The above experimental results also show that the monolayer film composed of PE alone or the monolayer film composed of a blend polymer of PP and PE with a PP amount of not greater than 20 wt % has a pore closing temperature of 110 to 140° C.

EXAMPLE 6

An investigation was made on the thickness of the positive electrode-side monolayer film that controls the oxidation resistance of the separator and that of the monolayer film having a pore closing temperature of 110 to 140° C. that controls the shut-down characteristic. For the investigation, multilayer films were produced as separators C11 to C15. The multilayer films had a three-layered structure of A/B/A. As the monolayer film A, a blend polymer of PP and PE was used. The ratio of PP and PE mixed in the blend polymer was 80:20 at a weight ratio. As the monolayer film B, a monolayer film composed of PE alone was used. Using the separator C4 used in EXAMPLE 4 and the separators C11 to C15, batteries A24, A31 to 35 of the present invention were produced. The battery A24 was the same one as produced in EXAMPLE 4. Further, for comparison, a battery B8 was produced using a separator C2 having a monolayer structure composed of PE alone. The battery B8 was the same one as produced in EXAMPLE 3.

(a) Production of Separators C11 to C15

As the raw material for the monolayer film A, 32 parts by weight of PP, 8 parts by weight of PE and 60 parts by weight of liquid paraffin were melted and mixed. Likewise, as the raw material for the monolayer film B, 45 parts by weight of PE and 55 parts by weight of liquid paraffin were melted and mixed. The melted and mixed raw materials were respectively extruded from two extruders equipped with a T-die for 3 layer coextrusion at the tip thereof. Thereby, a 1000 μm thick sheet having a three-layered structure was produced. The amounts of the resins extruded from the two extruders were adjusted such that the resulting monolayer films A and B had thicknesses listed in Table 8. This sheet was drawn in two directions (both horizontally and vertically) simultaneously in a tenter machine heated to 116° C., which was then immersed in methyl ethyl ketone to extract and remove the liquid paraffin, followed by drying. In this manner, separators C11 to 15, each having a thickness of 25 μm, were obtained.

TABLE 8

| Separator | Total thickness of separator (μm) | Monolayer film thickness (μm) A | Monolayer film thickness (μm) B | Air permeability (sec/100 ml) | Average pore size of monolayer film (μm) A | Average pore size of monolayer film (μm) B | Pore closing temperature (° C.) |
|---|---|---|---|---|---|---|---|
| C11 | 24.7 | 9.7 | 5.3 | 590 | 0.04 | 0.05 | 136 |
| C12 | 24.1 | 8.0 | 8.1 | 530 | 0.04 | 0.06 | 134 |
| C13 | 24.6 | 2.1 | 20.4 | 440 | 0.06 | 0.07 | 134 |
| C14 | 25.2 | 0.5 | 24.2 | 410 | 0.06 | 0.07 | 134 |
| C15 | 24.5 | 0.2 | 24.1 | 390 | 0.07 | 0.08 | 134 |

The obtained separators C11 to C15 were evaluated in the same manner as in EXAMPLE 4. The evaluation results are shown in Table 8. Although the pore closing temperature of C11 was 136° C., the pore closing temperature of C12 to C15 was the same as that of C4, namely 134° C.

Subsequently, cylindrical non-aqueous electrolyte secondary batteries were produced in the same manner as in EXAMPLE 1 except that the same positive electrode active material as used in the battery A4 of EXAMPLE 1, namely $LiCo_{0.94}Mg_{0.05}Al_{0.01}O_2$ was used, and that the separators C4, C11 to C15 were used. The obtained batteries were evaluated in the same manner as in EXAMPLE 5. The results are shown in Table 9.

TABLE 9

| Battery | Positive electrode active material | Separator | Rated battery capacity (mAh) | Recovery rate after constant voltage storage (%) 4.2 V | Recovery rate after constant voltage storage (%) 4.3 V | Recovery rate after constant voltage storage (%) 4.4 V | External short-circuit test Maximum temp. (° C.) |
|---|---|---|---|---|---|---|---|
| A31 | $LiCo_{0.94}Mg_{0.05}Al_{0.01}O_2$ | C11 | 1751 | 94 | 88 | 68 | 156 |
| A32 | $LiCo_{0.94}Mg_{0.05}Al_{0.01}O_2$ | C12 | 1753 | 95 | 89 | 70 | 145 |
| A24 | $LiCo_{0.94}Mg_{0.05}Al_{0.01}O_2$ | C4 | 1757 | 95 | 90 | 71 | 138 |

TABLE 9-continued

| Battery | Positive electrode active material | Separator | Rated battery capacity (mAh) | Recovery rate after constant voltage storage (%) | | | External short-circuit test Maximum temp. (° C.) |
|---|---|---|---|---|---|---|---|
| | | | | 4.2 V | 4.3 V | 4.4 V | |
| A33 | LiCo$_{0.94}$Mg$_{0.05}$Al$_{0.01}$O$_2$ | C13 | 1759 | 95 | 91 | 72 | 137 |
| A34 | LiCo$_{0.94}$Mg$_{0.05}$Al$_{0.01}$O$_2$ | C14 | 1756 | 92 | 85 | 69 | 137 |
| A35 | LiCo$_{0.94}$Mg$_{0.05}$Al$_{0.01}$O$_2$ | C15 | 1760 | 88 | 76 | 59 | 137 |
| B8 | LiCo$_{0.94}$Mg$_{0.05}$Al$_{0.01}$O$_2$ | C2 | 1758 | 80 | 62 | 15 | 137 |

FIG. 5 shows the relationship between the thickness of the monolayer film A and the recovery rate after constant voltage storage. FIG. 6 shows the relationship between the thickness of the monolayer film B and the maximum temperature during external short-circuit condition.

As can be seen from FIG. 5, when the monolayer film A had a thickness of not less than 0.2 μm, the recovery rate improved regardless of the voltage condition (4.2 V, 4.3 V or 4.4 V). This indicates that, when the monolayer film A has a thickness of not less than 0.2 μm, the oxidation of the separator can be prevented. FIG. 5 also shows that, even when the thickness of the monolayer film A was increased to 5 μm or greater, the recovery rate did not improve further.

Meanwhile, it is clear from FIG. 6 that, when the thickness of the monolayer film B was reduced to less than 15 μm, the maximum temperature during external short-circuit condition increased. Presumably, this is because, when the thickness of the monolayer film B is reduced to less than 15 μm, the shut-down function decreases. FIG. 6 indicates that, in order to control the maximum temperature during external short-circuit condition to not greater than 145° C., the thickness of the monolayer film B is preferably set at not less than 8 μm.

The experimental results described above show that, from the viewpoint of achieving both favorable recovery rate and safety, the monolayer film A preferably has a thickness of 0.2 to 5 μm, and the monolayer film B preferably has a thickness of not less than 8 μm.

EXAMPLE 7

An investigation was made on the effect of the drawing method in the production step of the separator on the productivity of the battery. In this example, a separator C1 formed by drawing all the monolayer films in one direction and a separator C4 formed by drawing all the monolayer films in two directions were subjected to an insulation test described below.

[Insulation Test]

Samples were first produced as follows. A jelly-roll type electrode group was formed in the same manner as that of the battery A4 of EXAMPLE 1 was formed using LiCo$_{0.94}$Mg$_{0.05}$Al$_{0.01}$O$_2$ as the positive electrode active material and a separator C1. Likewise, a jelly-roll type electrode group was formed in the same manner as that of the battery A24 of EXAMPLE 4 was formed using LiCo$_{0.94}$Mg$_{0.05}$Al$_{0.01}$O$_2$ as the positive electrode active material and a separator C4. On the top and bottom of each electrode group were placed insulating plates made of PP. A negative electrode lead was welded to each battery case made of iron plated with nickel. In this manner, samples were produced.

Subsequently, insulation test was conducted. For the test, an insulating resistance tester that measures up to 50 MΩ with a test voltage of 250 V was used. A voltage of 250 V was applied between the positive electrode lead and the battery case of each sample. Those having a resistance value of 10 MΩ or lower were rated as insulation failure. Then, the number of failure to the number of the sample tested was denoted as failure rate. The number of each sample tested was 10000. The results of the test are shown in Table 10.

TABLE 10

| Separator | Number of sample tested | Number of failure | Failure rate (%) |
|---|---|---|---|
| C1 | 10000 | 14 | 0.14 |
| C4 | 10000 | 0 | 0 |

It is clear from the results of Table 10 that the sample containing the separator C4 formed by drawing all the monolayer films in two direction exhibited a lower insulation failure rate than the sample containing the separator C1 formed by drawing all the monolayer films in one direction.

From the above, it was found that, from the viewpoint of productivity, the multilayer film used as the separator is preferably produced using monolayer films formed by drawing in two directions.

EXAMPLE 8

An investigation was made on the relationship of average pore size between the positive electrode-side monolayer film A and the monolayer film B having a pore closing temperature of 110 to 140° C. For the investigation, multilayer films were produced as separators C16 and C17. The multilayer films had a three-layered structure of A/B/A. As the monolayer film A, a blend polymer of PP and PE was used. The ratio of PP and PE mixed in the blend polymer was 80:20 at a weight ratio. As the monolayer film B, a monolayer film composed of PE alone was used. Using the separator C4 used in EXAMPLE 4 and the separators C16 and C17, batteries A24, A36 and 37 of the present invention were produced. The battery A24 was the same one as produced in EXAMPLE 4.

(a) Production of Separator C16

As the raw material for the monolayer film A, 32 parts by weight of PP, 8 parts by weight % of PE and 60 parts by weight of liquid paraffin were melted and mixed. Likewise, as the raw material for the monolayer film B, 55 parts by weight of PE and 45 parts by weight of liquid paraffin were melted and mixed. The melted and mixed raw materials were respectively extruded from two extruders equipped with a T-die for 3 layer coextrusion at the tip thereof. Thereby, a 1000 µm thick sheet having a three-layered structure was produced. The amounts of the resins extruded from the two extruders were adjusted such that the resulting monolayer films A and B had thicknesses listed in Table 8. This sheet was drawn in two directions (both horizontally and vertically) simultaneously in a tenter machine heated to 116° C., which was then immersed in methyl ethyl ketone to extract and remove the liquid paraffin, followed by drying. Thereby, a separator C16 having a thickness of 24.7 µm was obtained.

(b) Production of Separator C17

A separator C17 having a thickness of 24.9 µm was produced in the same manner as the separator C16 was produced except that the raw material for the monolayer film B was prepared by melting and mixing 65 parts by weight of PE and 35 parts by weight of liquid paraffin.

The obtained separators C16 and C17 were evaluated in the same manner as in EXAMPLE 4. The evaluation results are shown in Table 11. The separators C16 and C17, which were produced using a higher weight ratio of PE to liquid paraffin in the raw material of the monolayer film B than the weight ratio of the separator C4, had smaller average pore sizes and exhibited a greater air permeability than the separator C4.

TABLE 11

| Separator | Total thickness of separator (µm) | Monolayer film thickness (µm) A | Monolayer film thickness (µm) B | Air permeability (sec/100 ml) | Average pore size of monolayer film (µm) A | Average pore size of monolayer film (µm) B | Pore closing temperature (° C.) |
|---|---|---|---|---|---|---|---|
| C16 | 24.7 | 4.7 | 15.3 | 560 | 0.05 | 0.04 | 134 |
| C17 | 24.9 | 5.1 | 14.7 | 610 | 0.05 | 0.03 | 134 |

Subsequently, cylindrical non-aqueous electrolyte secondary batteries were produced in the same manner as the battery A4 of EXAMPLE 1 was produced except that the separators C16 and C17 were used. These batteries were evaluated in terms of rated battery capacity described in EXAMPLE 1 and high load discharge retention rate described below. The results are shown in Table 12.

[High Load Discharge Retention Rate]

After the rated battery capacity was measured, each battery was again charged, and constant current discharge was performed at a current value equal to a 0.5 hour discharge rate of the obtained rated battery capacity (equivalent to 2 C) until the battery voltage reached 3.0 V. The charge was performed at a constant current value of 400 mA until the battery voltage reached 4.2 V, and then at a constant voltage of 4.2 V for 2 hours.

The high load discharge retention rate was a ratio of the capacity obtained when discharged at a 0.5 hour rate to the rated battery capacity, in other words, a value calculated by the equation:

high load discharge retention rate=(discharge capacity at a current value of 0.5 hour rate/rated battery capacity)×100(%).

As an index of discharge load characteristic, the high load discharge retention rate thus obtained was used.

TABLE 12

| Battery | Positive electrode active material | Separator | Rated battery capacity (mAh) | High load discharge capacity retention rate (%) |
|---|---|---|---|---|
| A24 | $LiCo_{0.94}Mg_{0.05}Al_{0.01}O_2$ | C4 | 1757 | 94 |
| A36 | $LiCo_{0.94}Mg_{0.05}Al_{0.01}O_2$ | C16 | 1755 | 89 |
| A37 | $LiCo_{0.94}Mg_{0.05}Al_{0.01}O_2$ | C17 | 1752 | 83 |

As can be seen from Table 12, when the positive electrode-side monolayer film A has an average pore size D1, and the monolayer film B having a pore closing temperature of 110 to 140° C. has an average pore size D2, the batteries A36 and A37 containing the separators C16 and C17 with the relationship of D1>D2 exhibited a lower high load discharge retention rate than the battery A24 containing the separator C4 with the relationship of D1<D2. From this, it can be surmised that, during high load discharge, the monolayer film B might control the diffusion speed of lithium ions from the negative electrode to the positive electrode.

The experimental results described above show that, from the viewpoint of battery performance during high load discharge, when the average pore size of the positive electrode-side monolayer film A is D1, and that of the monolayer film B having a pore closing temperature of 110 to 140° C. is D2, D1 and D2 preferably satisfies D1<D2.

EXAMPLE 9

An investigation was made on the composition of the transition metal element Me in a composite oxide represented by the general formula: $Li_xMe_{1-y-z}M_yL_zO_2$. In this example, as the element Me, Ni alone or the combination of Ni and Co was used.

Positive electrode active materials having the compositions listed in Table 13 were prepared. Using the positive electrode active materials, batteries A1, A38 to 50 of the present invention and comparative batteries B10 to 11 were produced. Herein, the value of x was fixed to 1. As the separator, a C1 having a three-layered structure of PP/PE/PP described previously was used.

TABLE 13

| | $LiMe_{1-y-z}M_yL_z O_2$ | | | | Rated battery capacity | Recovery rate after constant voltage storage (%) | | |
|---|---|---|---|---|---|---|---|---|
| Battery | $Me_{1-y-z}$ | $M_y$ | $L_z$ | Separator | (mAh) | 4.2 V | 4.3 V | 4.4 V |
| A1 | $Co_{0.985}$ | $Mg_{0.005}$ | $Al_{0.01}$ | C1 | 1791 | 93 | 76 | 44 |
| A38 | $Ni_{0.8}Co_{0.185}$ | $Mg_{0.005}$ | $Al_{0.01}$ | C1 | 1922 | 98 | 92 | 58 |
| A39 | $Ni_{0.8}Co_{0.165}$ | $Mg_{0.005}$ | $Al_{0.03}$ | C1 | 1919 | 98 | 93 | 61 |
| B10 | $Ni_{0.8}Co_{0.2}$ | | | C1 | 1954 | 83 | 61 | 24 |
| A40 | $Ni_{0.5}$ | $Mn_{0.5}$ | | C1 | 1706 | 96 | 92 | 70 |

TABLE 13-continued

| Battery | LiMe$_{1-y-z}$M$_y$L$_z$O$_2$ | | | Separator | Rated battery capacity (mAh) | Recovery rate after constant voltage storage (%) | | |
|---|---|---|---|---|---|---|---|---|
| | Me$_{1-y-z}$ | M$_y$ | L$_z$ | | | 4.2 V | 4.3 V | 4.4 V |
| B11 | Ni$_{0.5}$ | Mg$_{0.5}$ | | C1 | 1423 | 98 | 95 | 76 |
| A41 | Ni$_{1/3}$Co$_{1/3}$ | Mn$_{1/3}$ | | C1 | 1783 | 96 | 93 | 75 |
| A42 | Ni$_{0.333}$Co$_{0.333}$ | Mn$_{0.333}$ | Al$_{0.001}$ | C1 | 1769 | 97 | 94 | 76 |
| A43 | Ni$_{0.5}$Co$_{0.2}$ | Mn$_{0.3}$ | | C1 | 1838 | 96 | 93 | 75 |
| A44 | Ni$_{0.5}$Co$_{0.199}$ | Mn$_{0.3}$ | Al$_{0.001}$ | C1 | 1833 | 97 | 94 | 76 |
| A45 | Ni$_{0.2}$Co$_{0.4}$ | Mn$_{0.4}$ | | C1 | 1735 | 91 | 72 | 40 |
| A46 | Ni$_{0.7}$Co$_{0.2}$ | Mn$_{0.1}$ | | C1 | 1855 | 95 | 92 | 69 |
| A47 | Ni$_{0.25}$Co$_{0.25}$ | Mn$_{0.5}$ | | C1 | 1657 | 90 | 70 | 38 |
| A48 | Ni$_{0.7}$Co$_{0.25}$ | Mg$_{0.03}$ | Al$_{0.02}$ | C1 | 1843 | 98 | 94 | 73 |
| A49 | Ni$_{0.85}$Co$_{0.1}$ | Mg$_{0.03}$ | Al$_{0.02}$ | C1 | 1889 | 98 | 95 | 74 |
| A50 | Ni$_{0.8}$Co$_{0.145}$ | Mg$_{0.005}$ | Al$_{0.05}$ | C1 | 1876 | 99 | 96 | 76 |

(a) Production of Positive Electrode Active Materials for Batteries A38, A39, A48 to 50

Positive electrode active materials for batteries A38, A39, A48 to 50 were prepared by a coprecipitation method described below.

Step A

A metal salt aqueous solution dissolving nickel sulfate, cobalt sulfate and magnesium sulfate was prepared.

The concentration of the nickel sulfate in the metal salt aqueous solution was 1 mol/L. The concentrations of the cobalt sulfate and magnesium sulfate were appropriately adjusted according to Table 13. While the metal salt aqueous solution maintained at 50° C. was stirred, an aqueous solution containing 30 wt % sodium hydroxide was added dropwise to the metal salt aqueous solution such that the pH of the aqueous solution was 12 so as to precipitate a nickel hydroxide containing cobalt and magnesium. The precipitate of the nickel hydroxide was filtrated, washed with water and dried in air.

Step B

The nickel hydroxide containing cobalt and magnesium obtained in Step A, aluminum hydroxide and lithium hydroxide were mixed at a molar ratio listed in Table 13. The molar ratio was Li:(Ni+Co+Mg+Al)=1:1. This mixture was fed into a rotary kiln, and preheated in an air atmosphere at 350° C. for 10 hours. The preheated mixture was then heated to 750° C. in an oxygen atmosphere in an electric furnace in 2 hours, and baked at 750° C. for 36 hours. The resultant was pulverized into powders having a 50% cumulative particle size of 10 μm obtained by laser diffractometry. Thereby, a positive electrode active material having the composition shown in Table 13 was obtained.

(b) Production of Positive Electrode Active Material for Battery B10

A positive electrode active material for battery 10 having the composition shown in Table 13 was obtained in the same manner as Steps A and B described in the above-described (a), except that Step A was performed without addition of magnesium sulfate, and that Step B was performed without addition of aluminum hydroxide.

(c) Production of Positive Electrode Active Material for Battery A40

A positive electrode active material for battery A40 was prepared by a coprecipitation method described below.

Step A

A metal aqueous solution dissolving nickel sulfate and manganese sulfate was prepared. The concentration of the nickel sulfate in the metal salt aqueous solution was 0.5 mol/L. The concentration of the manganese sulfate was appropriately adjusted according to Table 13. While the metal salt aqueous solution maintained at 50° C. was stirred, an aqueous solution containing 30 wt % sodium hydroxide was added dropwise to the metal salt aqueous solution such that the pH of the aqueous solution was 12 so as to precipitate a nickel hydroxide containing manganese. The precipitate of the nickel hydroxide was filtrated, washed with water and dried in air.

Step B

The nickel hydroxide containing manganese obtained in Step A and lithium hydroxide were mixed at a molar ratio of 1:1. This mixture was fed into a rotary kiln, and preheated in an air atmosphere at 350° C. for 10 hours. The preheated mixture was then heated to 800° C. in an oxygen atmosphere in an electric furnace in 2 hours, and baked at 800° C. for 36 hours. The resultant was pulverized into powders having a 50% cumulative particle size of 10 μm obtained by laser diffractometry. Thereby, a positive electrode active material having the composition shown in Table 13 was obtained.

(d) Production of Positive Electrode Active Material for Battery B11

A positive electrode active material for battery B11 having the composition shown in Table 13 was obtained in the same manner as in Steps A and B described in the above-described (c) except that, instead of manganese sulfate, magnesium sulfate was used.

(e) Production of Positive Electrode Active Materials for Batteries A41, A45 and A47

Step A

Positive electrode active materials for batteries 41, A45 and A47 were prepared by a coprecipitation method described below. A metal aqueous solution dissolving nickel sulfate, cobalt sulfate and manganese sulfate was prepared. The concentration of the nickel sulfate in the metal salt aqueous solution was 0.35 mol/L. The concentrations of the cobalt sulfate and manganese sulfate were appropriately adjusted according to Table 13. While the metal aqueous solution maintained at 50° C. was stirred, an aqueous solution containing 30 wt % sodium hydroxide was added dropwise thereto such that the pH of the aqueous solution was 12 so as to precipitate a nickel hydroxide containing cobalt and manganese. The precipitate of nickel hydroxide was filtrated, washed with water and dried in air.

Step B

The nickel hydroxide containing cobalt and manganese obtained in Step A and lithium hydroxide were mixed at a molar ratio of 1:1. This mixture was fed into a rotary kiln, and preheated in an air atmosphere at 350° C. for 10 hours. The preheated mixture was then heated to 850° C. in an oxygen atmosphere in an electric furnace in 2 hours, and baked at 850° C. for 36 hours. The resultant was pulverized into powders having a 50% cumulative particle size of 10 μm obtained by laser diffractometry. Thereby, a positive electrode active material having the composition shown in Table 13 was obtained.

(f) Production of Positive Electrode Active Material for Battery A42

A positive electrode active material for battery A42 having the composition shown in Table 13 was obtained in the same manner as Steps A and B described in the above-described (e) except that, in Step B, the nickel hydroxide containing cobalt and manganese obtained in Step A, aluminum hydroxide and lithium hydroxide were mixed at a molar ratio shown in Table 13 (here, the molar ratio of Li:(Co+Mg+Al) was 1:1).

(g) Production of Positive Electrode Active Materials for Batteries A43 and A46

Positive electrode active materials for batteries A43 and A46 having the compositions shown in Table 13 were obtained in the same manner as Steps A and B described in the above-described (e) except that, in Step A, the concentration of nickel sulfate was 0.5 mol/L, and that in Step B, the preheated mixture was heated to 800° C. in an electric furnace in 2 hours, and baked at 800° C. for 36 hours.

(h) Production of Positive Electrode Active Material for Battery A44

A positive electrode active material for battery A44 having the composition shown in Table 13 was obtained in the same manner as Steps A and B described in the above-described (f) except that, in Step A, the concentration of nickel sulfate was 0.5 mol/L, and that in Step B, the preheated mixture was heated to 800° C. in an electric furnace in 2 hours, and baked at 800° C. for 36 hours.

Using these positive electrode active materials, cylindrical non-aqueous electrolyte secondary batteries were produced and evaluated in the same manner as in EXAMPLE 1. The results are shown in Table 13.

Even when the element Me comprised the combination of Ni and Co, the effect produced by the addition of the element M and the element L was similar to that in the battery A4 in which the element Me comprised only Co.

In the positive electrode active material of the battery A38, the element Me was the combination of Ni and Co, the element M for stabilizing the crystal was Mg and the element L for preventing the reaction of the electrolyte on the active material surface was Al. In the battery B10, on the other hand, the element M and the element L were not added. As such, the battery B10 exhibited lower recovery rates after constant voltage storage at all the charge voltage (4.2 to 4.4 V) than the battery A38.

In the positive electrode active material of the battery A40, the element Me was Ni, and the element M was Mn with the value of y being 0.5. Similarly, in the battery B11, the element M was Mg with the value of y being 0.5. However, the battery A40 had a rated battery capacity of not less than 1650 mAh, which was larger than that of the battery B11. When the element M comprises Mn like the above, even if the value of y exceeds 0.1, the reduction of the rated battery capacity is small. Presumably, this is because Mn can retain a stable condition even when its valence is changed by the transfer of electrons. In other words, Mn is involved in the charge/discharge reaction of the battery, even when the amount of Mn is increased, the reduction of the rated battery capacity can be minimized.

The batteries A41 and A42 in which the molar ratio of Ni and Co was 1:1 and the batteries A43 and A44 in which the molar ratio was 5:2 exhibited excellent recovery rates after constant voltage storage at all the charge voltage (4.2 to 4.4 V) by adding the element M and the element L.

From the foregoing, it is clear that in a composite oxide represented by the general formula: $Li_xMe_{1-y-z}M_yL_zO_2$, even when the element Me comprises only Ni or the combination of Ni and Co, the effects of the element M and the element L can be obtained. In short, the element Me is not limited to Co. Even when the element Me comprises only a transition metal element having a similar atomic property, or the combination of such transition metal elements, the effects of the element M and the element L can be obtained. Further, when the element M is Mn, as long as $y \leq 0.5$, it is possible to provide a battery with little capacity degradation that can work without any trouble in practical use.

INDUSTRIAL APPLICABILITY

As described above, according to the present invention, it is possible to provide a non-aqueous electrolyte secondary battery having excellent safety and capable of retaining the performance even when charged to a high voltage at a high temperature. The present invention is particularly useful where the non-aqueous electrolyte secondary battery is charged by a charge control system whose end-of-charge voltage is set to not less than 4.3 V.

The invention claimed is:

1. A non-aqueous electrolyte secondary battery comprising a positive electrode, a negative electrode, a separator interposed between said positive electrode and said negative electrode, and an electrolyte,
    wherein said positive electrode comprises a positive electrode active material comprising a particle of a composite oxide represented by a general formula:

$Li_xMe_{1-y-z}M_yL_zO_2$, where said element Me is Ni and/or Co, said element M is at least one selected from the group consisting of Mg, Ti, and Zn, and said element L is at least one selected from the group consisting of Al, Ca, Ba, Sr, Y and Zr,
    said element M is uniformly distributed in said particle, and said element L is distributed more in a surface portion of said particle than an inside of said particle,
    said general formula satisfies $1 \leq x \leq 1.05$, $0.005 \leq y \leq 0.1$ and $0 \leq z \leq 0.05$,
    said separator comprises a plurality of laminated monolayer films,
    said plurality of monolayer films each have a microporous structure, and
    a positive electrode-side monolayer film selected from said plurality of monolayer films which faces said positive electrode comprises polypropylene.

2. The non-aqueous electrolyte secondary battery in accordance with claim 1, wherein said element Me includes Ni and Co, said element M is Mg, said element L is Al, said general formula satisfies $0.005 \leq y \leq 0.03$ and $0.01 \leq z \leq 0.05$.

3. The non-aqueous electrolyte secondary battery in accordance with claim 1, wherein said positive electrode-side monolayer film further comprises polyethylene, and the amount of said polypropylene is not less than 60 wt % relative to the total amount of said polypropylene and said polyethylene.

4. The non-aqueous electrolyte secondary battery in accordance with claim 1, wherein when a radius of said particle is r, said element L is distributed in a region within 0.3r from the surface of said particle at a concentration not less than 1.2 times higher than that in a region within 0.3r from the center of said particle.

5. The non-aqueous electrolyte secondary battery in accordance with claim 1, wherein at least one selected from said plurality of monolayer films has a pore closing temperature of 110 to 140° C.

6. The non-aqueous electrolyte secondary battery in accordance with claim 5, wherein said monolayer film having a pore closing temperature of 110 to 140° C. does not face said positive electrode and comprises polyethylene.

7. The non-aqueous electrolyte secondary battery in accordance with claim 6, wherein said monolayer film having a pore closing temperature of 110 to 140° C. further comprises polypropylene, and the amount of said polypropylene is not greater than 20 wt % relative to the total amount of said polyethylene and said polypropylene.

8. The non-aqueous electrolyte secondary battery in accordance with claim 5, wherein said at least one monolayer film having a pore closing temperature of 110 to 140° C. in said plurality of monolayer films has a thickness of not less than 8 μm.

9. The non-aqueous electrolyte secondary battery in accordance with claim 1, wherein said positive electrode-side monolayer film has a thickness of not less than 0.2 μm and not greater than 5 μm.

10. The non-aqueous electrolyte secondary battery in accordance with claim 1, wherein at least one of said plurality of monolayer films is formed by drawing a sheet obtained by extrusion in two directions.

11. The non-aqueous electrolyte secondary battery in accordance with claim 6, wherein when said positive electrode-side monolayer film has an average pore size D1 based on a total pore volume measured by a mercury intrusion method, and said monolayer film having a pore closing temperature of 110 to 140° C. has an average pore size D2 based on a total pore volume measured by a mercury intrusion method, D1<D2 is satisfied.

12. The non-aqueous electrolyte secondary battery in accordance with claim 1, wherein said battery is charged by a charge control system whose end-of-charge voltage is set to not less than 4.3 V.

* * * * *